United States Patent
Philip et al.

(10) Patent No.: US 9,825,809 B2
(45) Date of Patent: Nov. 21, 2017

(54) DYNAMICALLY CONFIGURING STORE-AND-FORWARD CHANNELS AND CUT-THROUGH CHANNELS IN A NETWORK-ON-CHIP

(71) Applicant: NetSpeed Systems, San Jose, CA (US)

(72) Inventors: Joji Philip, San Jose, CA (US); Sailesh Kumar, San Jose, CA (US)

(73) Assignee: NETSPEED SYSTEMS, San Jose, CA (US)

( * ) Notice: Subject to any disclaimer, the term of this patent is extended or adjusted under 35 U.S.C. 154(b) by 349 days.

(21) Appl. No.: 14/726,235

(22) Filed: May 29, 2015

(65) Prior Publication Data

US 2017/0063609 A1   Mar. 2, 2017

(51) Int. Cl.
| H04L 12/24 | (2006.01) |
| H04L 12/947 | (2013.01) |
| H04L 12/741 | (2013.01) |
| H04L 12/46 | (2006.01) |

(52) U.S. Cl.
CPC ...... *H04L 41/0803* (2013.01); *H04L 12/4641* (2013.01); *H04L 45/745* (2013.01); *H04L 49/251* (2013.01); *H04L 49/252* (2013.01)

(58) Field of Classification Search
CPC ....... H04L 12/24; H04L 12/741; H04L 12/46; H04L 12/947; H04L 41/0803; H04L 49/252; H04L 45/745; H04L 12/4641; H04L 49/251
See application file for complete search history.

(56) References Cited

U.S. PATENT DOCUMENTS

| 4,409,838 A | 10/1983 | Schomberg |
| 4,933,933 A | 6/1990 | Dally et al. |
| 5,105,424 A | 4/1992 | Flaig et al. |

(Continued)

FOREIGN PATENT DOCUMENTS

| CN | 103684961 A | 3/2014 |
| JP | 5936793 | 6/2016 |

(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.

(Continued)

*Primary Examiner* — Andrew Lee
(74) *Attorney, Agent, or Firm* — Procopio, Cory, Hargreaves & Savitch LLP

(57) ABSTRACT

Aspects of the present disclosure relates to methods, computer readable mediums, and NoC architectures/systems/constructions that can automatically mark and configure some channel of a NoC as store-and-forward channels, and other channels of the NoC as cut-through channels, and can further resize the buffers/channels based on the given NoC specification and associated traffic profile. An aspect of the present disclosure relates to a method for configuring a first set of plurality of channels of a NoC as store-and-forward channels, and configuring a second set of plurality of channels of the NoC as cut-through channels based on the determination of idle cycles in a given NoC specification and associated traffic profile.

18 Claims, 15 Drawing Sheets

(56) References Cited

U.S. PATENT DOCUMENTS

| | | | |
|---|---|---|---|
| 5,163,016 A | 11/1992 | Har'El et al. |
| 5,355,455 A | 10/1994 | Hilgendorf et al. |
| 5,432,785 A | 7/1995 | Ahmed et al. |
| 5,563,003 A | 10/1996 | Suzuki et al. |
| 5,583,990 A | 12/1996 | Birrittella et al. |
| 5,588,152 A | 12/1996 | Dapp et al. |
| 5,764,740 A | 6/1998 | Holender |
| 5,764,741 A | 6/1998 | Holender |
| 5,859,981 A | 1/1999 | Levin et al. |
| 5,991,308 A | 11/1999 | Fuhrmann et al. |
| 6,003,029 A | 12/1999 | Agrawal et al. |
| 6,029,220 A | 2/2000 | Iwamura et al. |
| 6,058,385 A | 5/2000 | Koza et al. |
| 6,101,181 A | 8/2000 | Passint et al. |
| 6,108,739 A | 8/2000 | James et al. |
| 6,249,902 B1 | 6/2001 | Igusa et al. |
| 6,314,487 B1 | 11/2001 | Hahn et al. |
| 6,377,543 B1 | 4/2002 | Grover |
| 6,415,282 B1 | 7/2002 | Mukherjea et al. |
| 6,674,720 B1 | 1/2004 | Passint et al. |
| 6,711,717 B2 | 3/2004 | Nystrom et al. |
| 6,925,627 B1 | 8/2005 | Longway et al. |
| 6,967,926 B1 | 11/2005 | Williams, Jr. et al. |
| 6,983,461 B2 | 1/2006 | Hutchison et al. |
| 7,046,633 B2 | 5/2006 | Carvey |
| 7,065,730 B2 | 6/2006 | Alpert et al. |
| 7,143,221 B2 | 11/2006 | Bruce et al. |
| 7,318,214 B1 | 1/2008 | Prasad et al. |
| 7,379,424 B1 | 5/2008 | Krueger |
| 7,437,518 B2 | 10/2008 | Tsien |
| 7,461,236 B1 | 12/2008 | Wentzlaff |
| 7,509,619 B1 | 3/2009 | Miller et al. |
| 7,564,865 B2 | 7/2009 | Radulescu |
| 7,583,602 B2 | 9/2009 | Bejerano |
| 7,590,959 B2 | 9/2009 | Tanaka |
| 7,693,064 B2 | 4/2010 | Thubert et al. |
| 7,701,252 B1 | 4/2010 | Chow et al. |
| 7,724,735 B2 | 5/2010 | Locatelli et al. |
| 7,725,859 B1 | 5/2010 | Lenahan et al. |
| 7,774,783 B2 | 8/2010 | Toader |
| 7,808,968 B1 | 10/2010 | Kalmanek, Jr. et al. |
| 7,853,774 B1 | 12/2010 | Wentzlaff |
| 7,917,885 B2 | 3/2011 | Becker |
| 7,957,381 B2 | 6/2011 | Clermidy et al. |
| 7,973,804 B2 | 7/2011 | Mejdrich et al. |
| 8,018,249 B2 | 9/2011 | Koch et al. |
| 8,020,163 B2 | 9/2011 | Nollet et al. |
| 8,020,168 B2 | 9/2011 | Hoover et al. |
| 8,050,256 B1 | 11/2011 | Bao et al. |
| 8,059,551 B2 | 11/2011 | Milliken |
| 8,099,757 B2 | 1/2012 | Riedle et al. |
| 8,136,071 B2 | 3/2012 | Solomon |
| 8,203,938 B2 | 6/2012 | Gibbings |
| 8,261,025 B2 | 9/2012 | Mejdrich et al. |
| 8,281,297 B2 | 10/2012 | Dasu et al. |
| 8,306,042 B1 | 11/2012 | Abts |
| 8,312,402 B1 | 11/2012 | Okhmatovski et al. |
| 8,352,774 B2 | 1/2013 | Elrabaa |
| 8,407,425 B2 | 3/2013 | Gueron et al. |
| 8,412,795 B2 | 4/2013 | Mangano et al. |
| 8,438,578 B2 | 5/2013 | Hoover et al. |
| 8,448,102 B2 | 5/2013 | Komachuk et al. |
| 8,490,110 B2 | 7/2013 | Hoover et al. |
| 8,492,886 B2 | 7/2013 | Or-Bach et al. |
| 8,514,889 B2 | 8/2013 | Jayasimha |
| 8,541,819 B1 | 9/2013 | Or-Bach et al. |
| 8,543,964 B2 | 9/2013 | Ge et al. |
| 8,601,423 B2 | 12/2013 | Philip et al. |
| 8,619,622 B2 | 12/2013 | Harrand et al. |
| 8,635,577 B2 | 1/2014 | Kazda et al. |
| 8,661,455 B2 | 2/2014 | Mejdrich et al. |
| 8,667,439 B1 | 3/2014 | Kumar et al. |
| 8,705,368 B1 | 4/2014 | Abts et al. |
| 8,711,867 B2 | 4/2014 | Guo et al. |
| 8,717,875 B2 | 5/2014 | Bejerano et al. |
| 8,726,295 B2 | 5/2014 | Hoover et al. |
| 8,738,860 B1 | 5/2014 | Griffin et al. |
| 8,793,644 B2 | 7/2014 | Michel et al. |
| 8,798,038 B2 | 8/2014 | Jayasimha et al. |
| 8,819,611 B2 | 8/2014 | Philip et al. |
| 9,210,048 B1 | 12/2015 | Marr |
| 9,571,341 B1 | 2/2017 | Kumar et al. |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2003/0026267 A1* | 2/2003 | Oberman ............... H04L 47/10 370/397 |
| 2003/0088602 A1 | 5/2003 | Dutta et al. |
| 2003/0145314 A1 | 7/2003 | Nguyen et al. |
| 2004/0049565 A1 | 3/2004 | Keller et al. |
| 2004/0103218 A1 | 5/2004 | Blumrich et al. |
| 2004/0216072 A1 | 10/2004 | Alpert et al. |
| 2005/0147081 A1 | 7/2005 | Acharya et al. |
| 2005/0201356 A1* | 9/2005 | Miura ..................... H04L 45/00 370/351 |
| 2005/0203988 A1 | 9/2005 | Nollet et al. |
| 2006/0002303 A1 | 1/2006 | Bejerano |
| 2006/0031615 A1 | 2/2006 | Bruce et al. |
| 2006/0075169 A1 | 4/2006 | Harris et al. |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0025242 A1* | 2/2007 | Tsang ..................... H04L 47/10 370/229 |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0123679 A1* | 5/2008 | Scott .................. G06F 11/0781 370/422 |
| 2008/0126569 A1 | 5/2008 | Rhim et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1* | 2/2009 | Towles ..................... H04L 45/00 370/397 |
| 2009/0070726 A1 | 3/2009 | Mehrotra et al. |
| 2009/0122703 A1 | 5/2009 | Gangwal et al. |
| 2009/0172304 A1 | 7/2009 | Gueron et al. |
| 2009/0180494 A1* | 7/2009 | Ren ........................ H04L 49/901 370/476 |
| 2009/0187716 A1 | 7/2009 | Comparan et al. |
| 2009/0187756 A1 | 7/2009 | Nollet et al. |
| 2009/0210184 A1 | 8/2009 | Medardoni et al. |
| 2009/0231348 A1 | 9/2009 | Mejdrich et al. |
| 2009/0268677 A1 | 10/2009 | Chou et al. |
| 2009/0285222 A1 | 11/2009 | Hoover et al. |
| 2009/0300292 A1 | 12/2009 | Fang et al. |
| 2009/0307714 A1 | 12/2009 | Hoover et al. |
| 2009/0313592 A1 | 12/2009 | Murali et al. |
| 2010/0040162 A1 | 2/2010 | Suehiro |
| 2010/0158005 A1 | 6/2010 | Mukhopadhyay et al. |
| 2010/0211718 A1 | 8/2010 | Gratz et al. |
| 2010/0223505 A1 | 9/2010 | Andreev et al. |
| 2010/0315960 A1* | 12/2010 | Li .......................... H04L 43/00 370/252 |
| 2011/0022754 A1 | 1/2011 | Cidon et al. |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0085550 A1 | 4/2011 | Lecler et al. |
| 2011/0085561 A1 | 4/2011 | Ahn |
| 2011/0103799 A1 | 5/2011 | Shacham et al. |

(56) References Cited

U.S. PATENT DOCUMENTS

| | | | |
|---|---|---|---|
| 2011/0154282 | A1 | 6/2011 | Chang et al. |
| 2011/0191774 | A1 | 8/2011 | Hsu et al. |
| 2011/0235531 | A1 | 9/2011 | Vangal et al. |
| 2011/0276937 | A1 | 11/2011 | Waller |
| 2011/0302345 | A1 | 12/2011 | Boucard et al. |
| 2011/0307734 | A1 | 12/2011 | Boesen et al. |
| 2011/0320854 | A1 | 12/2011 | Elrabaa |
| 2012/0022841 | A1 | 1/2012 | Appleyard |
| 2012/0023473 | A1 | 1/2012 | Brown et al. |
| 2012/0026917 | A1 | 2/2012 | Guo et al. |
| 2012/0079147 | A1 | 3/2012 | Ishii et al. |
| 2012/0099475 | A1 | 4/2012 | Tokuoka |
| 2012/0110106 | A1 | 5/2012 | De Lescure et al. |
| 2012/0110541 | A1 | 5/2012 | Ge et al. |
| 2012/0144065 | A1 | 6/2012 | Parker |
| 2012/0155250 | A1 | 6/2012 | Carney et al. |
| 2012/0173846 | A1 | 7/2012 | Wang et al. |
| 2012/0195321 | A1 | 8/2012 | Ramanujam |
| 2012/0209944 | A1 | 8/2012 | Mejdrich et al. |
| 2013/0028090 | A1 | 1/2013 | Yamaguchi et al. |
| 2013/0028261 | A1 | 1/2013 | Lee |
| 2013/0051397 | A1 | 2/2013 | Guo et al. |
| 2013/0054811 | A1 | 2/2013 | Harrand |
| 2013/0080073 | A1 | 3/2013 | de Corral |
| 2013/0103369 | A1 | 4/2013 | Huynh et al. |
| 2013/0103912 | A1 | 4/2013 | Jones et al. |
| 2013/0117543 | A1 | 5/2013 | Venkataramanan et al. |
| 2013/0148506 | A1 | 6/2013 | Lea |
| 2013/0151215 | A1 | 6/2013 | Mustapha |
| 2013/0159944 | A1 | 6/2013 | Uno et al. |
| 2013/0163615 | A1 | 6/2013 | Mangano et al. |
| 2013/0174113 | A1 | 7/2013 | Lecler et al. |
| 2013/0179613 | A1 | 7/2013 | Boucard et al. |
| 2013/0179902 | A1 | 7/2013 | Hoover et al. |
| 2013/0191572 | A1 | 7/2013 | Nooney et al. |
| 2013/0195210 | A1* | 8/2013 | Swarbrick ............... H04L 25/02 375/259 |
| 2013/0207801 | A1 | 8/2013 | Barnes |
| 2013/0219148 | A1 | 8/2013 | Chen et al. |
| 2013/0250792 | A1 | 9/2013 | Yoshida et al. |
| 2013/0254488 | A1 | 9/2013 | Kaxiras et al. |
| 2013/0263068 | A1 | 10/2013 | Cho et al. |
| 2013/0268990 | A1 | 10/2013 | Urzi et al. |
| 2013/0326458 | A1 | 12/2013 | Kazda et al. |
| 2014/0068132 | A1 | 3/2014 | Philip et al. |
| 2014/0068134 | A1 | 3/2014 | Philip et al. |
| 2014/0092740 | A1 | 4/2014 | Wang et al. |
| 2014/0098683 | A1 | 4/2014 | Kumar et al. |
| 2014/0112149 | A1 | 4/2014 | Urzi et al. |
| 2014/0115218 | A1 | 4/2014 | Philip et al. |
| 2014/0115298 | A1 | 4/2014 | Philip et al. |
| 2014/0211622 | A1 | 7/2014 | Kumar et al. |
| 2014/0254388 | A1 | 9/2014 | Kumar et al. |
| 2015/0043575 | A1 | 2/2015 | Kumar et al. |
| 2015/0109024 | A1 | 4/2015 | Abdelfattah et al. |
| 2015/0117177 | A1* | 4/2015 | Ganga ................... H04L 49/251 370/216 |
| 2015/0159330 | A1 | 6/2015 | Weisman et al. |
| 2015/0195191 | A1* | 7/2015 | Inoue ................ G06F 15/17362 709/239 |
| 2016/0191034 | A1* | 6/2016 | Wagh ..................... G01R 31/041 327/233 |
| 2016/0226797 | A1* | 8/2016 | Aravinthan ......... H04L 49/3027 |

FOREIGN PATENT DOCUMENTS

| | | |
|---|---|---|
| JP | 6060316 B2 | 1/2017 |
| KR | 10-2013-0033898 A1 | 4/2013 |
| KR | 101652490 | 8/2016 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-core System-on-Chip Design, IEEE Transactions on Computer-Aided Design of Integrated Circuits and Systems, Aug. 2011, 30(8), pp. 1211-1224.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, pp. 253-262.

Grot, B., Preemptive Virtual Clock: A Flexible, Efficient, and Cost-Effective QOS Scheme for Networks-on-Chip, Micro '09, Dec. 16, 2009, 12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Hestness, J., et al., Netrace: Dependency-Tracking for Efficient Network-on-Chip Experimentation, The University of Texas at Austin, Dept. of Computer Science, May 2011, 20 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B. et al., CoQoS: Coordinating QoS-Aware Shared Resources in NoC-based SoCs, J. Parallel Distrib. Comput., 71 (5), May 2011, 14 pgs.

Lin, S., et al., Scalable Connection-Based Flow Control Scheme for Application-Specific Network-on-Chip, The Journal of China Universities of Posts and Telecommunications, Dec. 2011, 18(6), pp. 98-105.

Bolotin, Evgency, et al., "QNoC: QoS Architecture and Design Process for Network on Chip" 2004, 24 pages, Journal of Systems Architecture 50 (2004) 105-128 Elsevier.

Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.

Yang, J., et al., Homogeneous NoC-based FPGA: The Foundation for Virtual FPGA, 10th IEEE International Conference on Computer and Information Technology (CIT 2010), Jun. 2010, pp. 62-67.

Zaman, Aanam, et al., "Formal Verification of Circuit-Switched Network on Chip (NoC) Architectures using SPIN", IEEE © 2014, 8 pages.

International Search Report and Written Opinion for PCT/US2014/023625, dated Jul. 10, 2014, 9 pgs.

International Search Report and Written Opinion for PCT/US2014/012012, dated May 14, 2014, 10 pgs.

International Search Report and Written Opinion for PCT/US2014/037902, dated Sep. 30, 2014, 14 pgs.

International Search Report and Written Opinion for PCT/US2014/048190, dated Nov. 28, 2014, 11 pgs.

International Search Report and Written Opinion for PCT/US2014/060745, dated Jan. 21, 2015, 10 pgs.

International Search Report and Written Opinion for PCT/US2014/060879, dated Jan. 21, 2015, 10 pgs.

International Search Report and Written Opinion for PCT/US2014/060892, dated Jan. 27, 2015, 10 pgs.

(56) References Cited

OTHER PUBLICATIONS

International Search Report and Written Opinion for PCT/US2014/060886, dated Jan. 26, 2015, 10 pgs.
International Search Report and Written Opinion for PCT/US2013/064140, dated Jan. 22, 2014, 9 pgs.
International Search Report and Written Opinion for PCT/US2014/012003, Mar. 26, 2014, 9 pgs.
International Preliminary Report on Patentability for International Application No. PCT/US2013/064140, dated Apr. 23, 2015, 6 pages.
Office Action for Japanese Patent Application No. 2016-516030 dated Aug. 30, 2016, 2 pages, Japan Patent Office.
Decision to Grant for Japanese Patent Application No. 2016-516030 dated Nov. 22, 2016, 3 pages, untranslated, Japan Patent Office.
Office Action for Korean Patent Application No. 10-2016-7019093 dated Sep. 8, 2016, 3 pages plus 1 page English translation. KIPO, Korea.
Notice of Allowance for for Korean Patent Application No. 10-2016-7019093 dated Dec. 5, 2016, 5 pages. KIPO, Korea.
Notice of Grant for Japanese Patent Application No. 2015-535898 dated Jan. 17, 2017, 3 pages, untranslated. Japan Patent Office.
Office Action for Japanese Patent Application No. 2015-535898 dated Oct. 25, 2016, 2 pages English, 2 pages untranslated. Japan Patent Office.

* cited by examiner

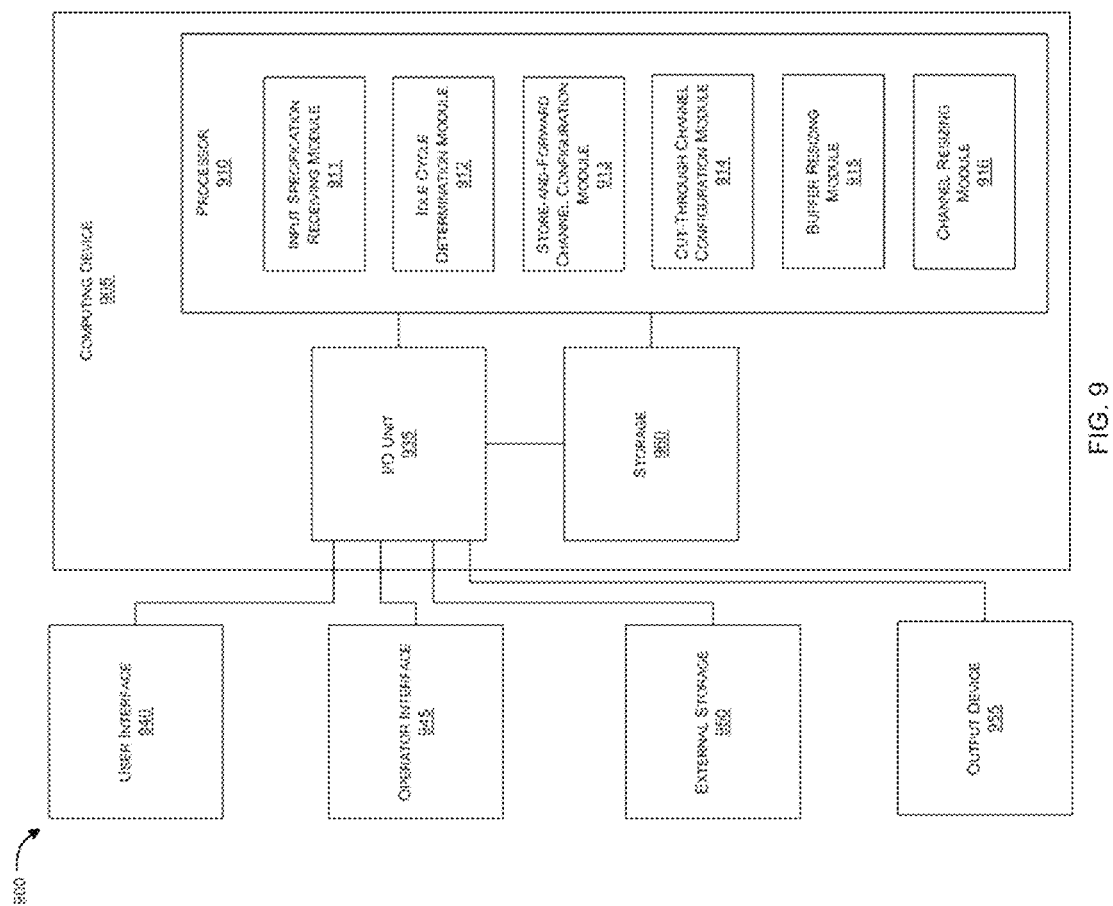

US 9,825,809 B2

DYNAMICALLY CONFIGURING STORE-AND-FORWARD CHANNELS AND CUT-THROUGH CHANNELS IN A NETWORK-ON-CHIP

BACKGROUND

Technical Field

Methods and example implementations described herein are directed to interconnect architecture, and more specifically, to Network on Chip architectures with store and forward and cut-through virtual channels.

Related Art

The number of components on a chip is rapidly growing due to increasing levels of integration, system complexity and shrinking transistor geometry. Complex System-on-Chips (SoCs) may involve a variety of components e.g., processor cores, Digital Signal Processors (DSPs), hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIGS. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoCs shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present disclosure will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. Abridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

Network elements of NoC generally use cut-through architecture, where arbitration of frames/flits (of a packet) for forwarding to destination port(s) starts as soon as the destination address information is retrieved from initial frames/flits of the packet. A NoC element using cut-through architecture starts forwarding the flits as soon as the destination/next hop information is available and generally blocks the output channel till the last frame/flits of the packet is forwarded. The cut-though architecture is marked as low latency, however the overall performance and resource utilization of the network elements reduces as the output channels are blocked even if it is not transmitting any data. There may be some idle cycles at the output channel due the fact that the input channel may be feeding the data at slower rate when compared with the output channel, or the input channel may have its width less than that of the output channel. In a cut-through NoC design, when multi-flit packets travel through a channel, the channel is locked for the entire duration of the packet as interleaving of multiple packets on the same channel is generally not allowed to avoid deadlock. In such cases, if packet transmission is slow, i.e. flits are not being sent every clock cycle on the channel, then the channel will be underutilized during this transmission, leading to lower NoC performance and efficiency. Slow transmission of packets on a channel may occur due to a variety of reasons, including but not limited to slow input rate, smaller channel bandwidth, channel width, channel bandwidth, among other like parameters. Idle cycle for a channel may occur if the transmitting agent is sending flits of a packet at a lower rate than the capacity of the channel or when less than one flit per clock cycle is being transmitted. Slow transmission of packets or idle cycle may also occur when a packet goes from a narrow channel to a wide channel, for example, when packets moves from 64-bit output channel to 128-bit channel. Idle cycle may also occur when a channel operating at low clock frequency transmits flits to a channel operating at high clock frequency. For example, when an input channel operating at 100 MHz sends a flit per 100 MHz clock cycle to an output channel operating at 200 MHz, the output channel will see a flit every alternate cycle only. Flits may arrive at lower rate at a channel if there is a performance bottleneck due to lack of flow control buffers and full throughput is not maintained on the channel.

To overcome the limitations of the cut-through scheduling architecture, store-and-forward switching architecture were proposed, where the entire packet is stored before starting routing arbitration for forwarding the packet to the destination address/next hop in the network. All frames/flits of the packets are stored in the buffer of the network element before scheduling the initial flits and subsequent flits of the packet to the next hop or destination address. To store all flits of the packet, a buffer of size equal to the longest possible packet needs to be attached with each network element, and therefore, although store-and-forward switching improves throughput rate and utilization of output network elements in some cases, it may reduce the latency of the network. It may not be a desirable option to provide a big buffer to each network element to store the longest possible packet as the average packet size may be much smaller than the longest allowed packets, and hence the part of the costly buffer would be kept idle for most of the time. Also, latency of the network element may suffer as the network element may wait for arrival of the entire packet before scheduling the packet to the next hop or destination address. Architectures can also include hybrid channels (hybrid of store-and-forward and cut-through), wherein buffer of a NoC can buffer flits of each incoming packet till its defined buffer size is full before forwarding the buffered flits to the next hop, which, although in most cases can buffer the complete packet, in certain other cases, only a part of the packet is buffered and the remaining flits of the packet are sent in the subsequent set of buffered flits, like in a cut-through architecture.

Therefore, there is a need for a method, a computer readable medium, and a NoC architecture/construction that can automatically configure some of the channels of network element as store-and-forward channels, and other channels as cut-through channels or even hybrid channels based on the NoC specification, traffic profile, bandwidth/width/frequency parameters, among other parameters so as to reduce the latency, and maintain high performance/throughput/utilization of network resources.

SUMMARY

Aspects of the present disclosure relates to methods, computer readable mediums, and NoC architectures/systems/constructions that can automatically mark and configure some channel of a NoC as store-and-forward channels, and other channels of the NoC as cut-through channels, and can further resize the buffers/channels based on the given NoC specification and associated traffic profile. An aspect of the present disclosure relates to a method for configuring a first set of plurality of channels of a NoC as store-and-forward channels, and configuring a second set of plurality of channels of the NoC as cut-through channels based on the determination of idle cycles in a given NoC specification and associated traffic profile.

In an aspect, methods of the present disclosure relates to configuring, for a Network on Chip (NoC), at least a first set of plurality of virtual channels of the NoC as a store and forward channels, and configuring a set of plurality of virtual channels of the NoC as cut-through channels. Methods of the present disclosure can further enable one or more hardware elements of the NoC to use the store-and-forward virtual channels for transmission of flits by storing the received flits into a buffer, until the buffer is full, end of packet flit is received, or after a pre-configured timeout is reached, and then begin forwarding the flits of the packet through the store-and-forward virtual channels. Methods of the present disclosure can further enable one or more hardware elements of the NoC to use the cut-through channels for transmission of flits by forwarding received flits through at least one of the cut-through channels as and when received.

In another aspect, methods of the present disclosure includes the steps of receiving NoC specification and an associated traffic profile, determining the idle cycles for a plurality of virtual channels by analyzing the NoC specification and associated traffic profile, marking and configuring a first set of plurality of channels as store and forward channels, and marking and configuring a second set of plurality of channels as cut-through channels based on the determination of idle cycles. In an example implementation, all the remaining channels which are not the first set of plurality of channel marked as store and forward channel can be marked as cut-through channels. Methods of the present disclosure can further include the steps of resizing a plurality of input buffers and/or output buffers of the network elements, and resizing the plurality of downstream channels and/or upstream channels. In example implementation, resizing of the plurality of input buffers and/or output buffers can be performed by increasing and/or reducing the size and/or depth of buffers, whereas resizing of plurality of downstream channels and/or upstream channels can be performed by increasing and/or reducing width and/or depth of the channels.

In an example implementation, a network element of the NoC can have one or more of its input/upstream channels configured as store and forward channels, and other input/upstream channels configured as cut-through channels. In an example implementation, flits received at the input/upstream channels configured as store and forward channels can be stored in a buffer of the associated input port of the network element until all flits of a multi-flit packet are stored in the buffer or until the buffer is full. In an example implementation, initial flits and subsequent flits of a multi-flit packet received from a channel marked and configured as store and forward channel participate in routing arbitration only if all flits of the multi-flit packet are stored in the buffer or if the buffer is full. In an example implementation, all the flits received at a channel marked as store and forward channel are stored into a buffer until the buffer the full, end of the packet flit is received or after a pre-configured timeout is reached, In an example implementation, size of buffer can be dynamically resized based on the traffic specification. In example implementation, flits received from a channel marked and configured as cut through channel participate in routing arbitration as soon as the initial flit containing the destination address is received.

In an example implementation, the first set of plurality of channels can be marked and configured as store and forward channels based on an occurrence of idle cycles between flits of a packet, and bandwidth requirement of the plurality of channels. In an example implementation, potential idle cycles between flits of a message can be determined by analyzing clock cycle difference of input channels and output channels, and/or by analyzing flit size difference of input channels and output channels, and/or by analyzing speed difference of input channels and output channels of network elements. In an example implementation, difference in channel width and/or depth of input channels and output channels can be used for determining the idle cycles.

In an example implementation, the first set of plurality of channels marked and configured as store and forward channels can be further marked and configured as cut-through channels in real time during different iterations based on the updated traffic profile and/or changing bandwidth requirement. Similarly, the second set of plurality of channels marked and configured as cut-through channels can be further changed/marked and configured as store and forward channels in real time during different iterations based on the updated traffic profile and/or changing bandwidth requirements.

In an example implementation, the size of the buffer for the channels marked as store and forward channel can be calculated using a function based on bandwidth and message size distribution of associated one or more channels configured as the store and forward channel.

In an aspect, the present disclosure relates to a Network on Chip (NoC) that has a plurality of virtual channels, wherein a first set of virtual channels of the NoC are configured as a store and forward channels and a second set of virtual channels of the NoC are configured as cut through channels such that one or more hardware elements of the NoC, for flits received for transmission to the first set of virtual channels, store the received flits into a buffer, until the buffer is full, end of packet flit is received or after a pre-configured timeout is reached, and then begin forwarding the flits of the packet through one of the first set of virtual channels. Similarly, one or more hardware elements of the NoC, for flits received for transmission to the second set of virtual channels, forward the received flits sooner they are received through one of the second set of virtual channels.

In another aspect, the first set of virtual channels include channels that are selected based on occurrence of idle cycles between flits of a message and/or based on bandwidth requirement of the virtual channels. The second set of channels can include the remaining virtual channels.

In another aspect, virtual channels that are selected based on an occurrence of idle cycles between flits of a message can be selected based on any or a combination of virtual channels having differing clock ratios at an input and an output of the plurality of virtual channels, or virtual channels having differing flit sizes at the input and the output of the plurality of virtual channels, virtual channels having transmitters sending messages at lower speed than the speed of the plurality of virtual channels.

BRIEF DESCRIPTION OF THE DRAWINGS

FIG. 9 illustrates an example computer system on which example implementation can be present disclosure can be executed in accordance with an example implementation of the present disclosure.

DETAILED DESCRIPTION

Figure 1A:
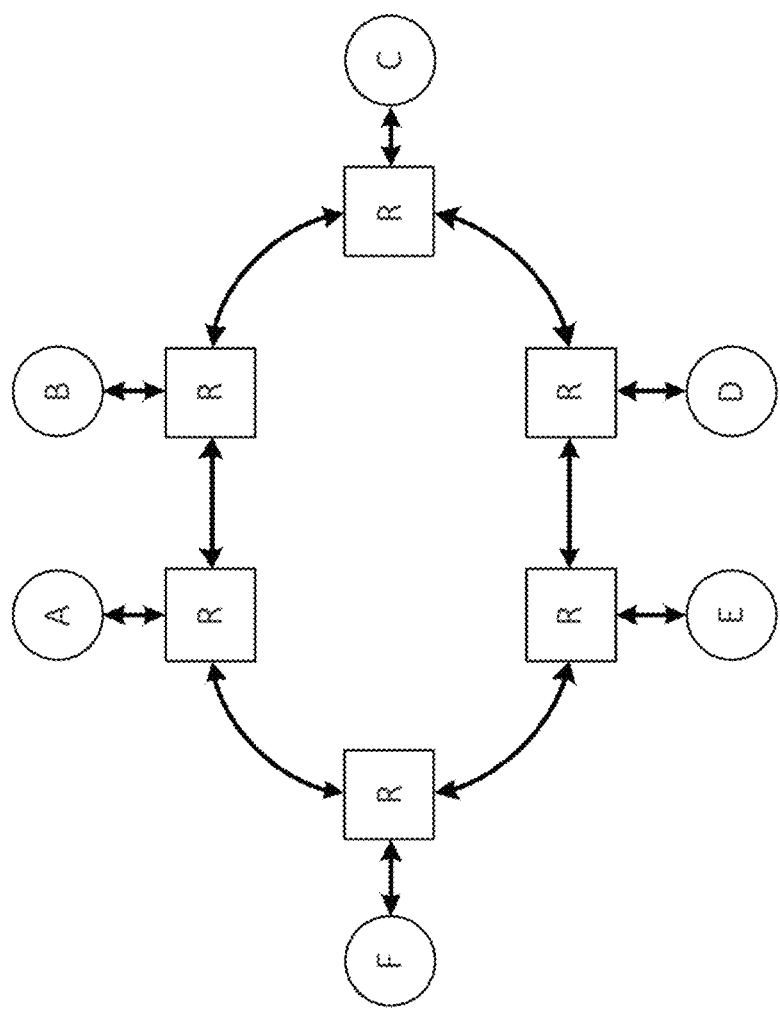
FIGS. 1(a), 1(b), 1(c) and 1(d) illustrate examples of Bidirectional ring,2D Mesh,2D Taurus, and 3D Mesh NoC Topologies.
Figure 1B:
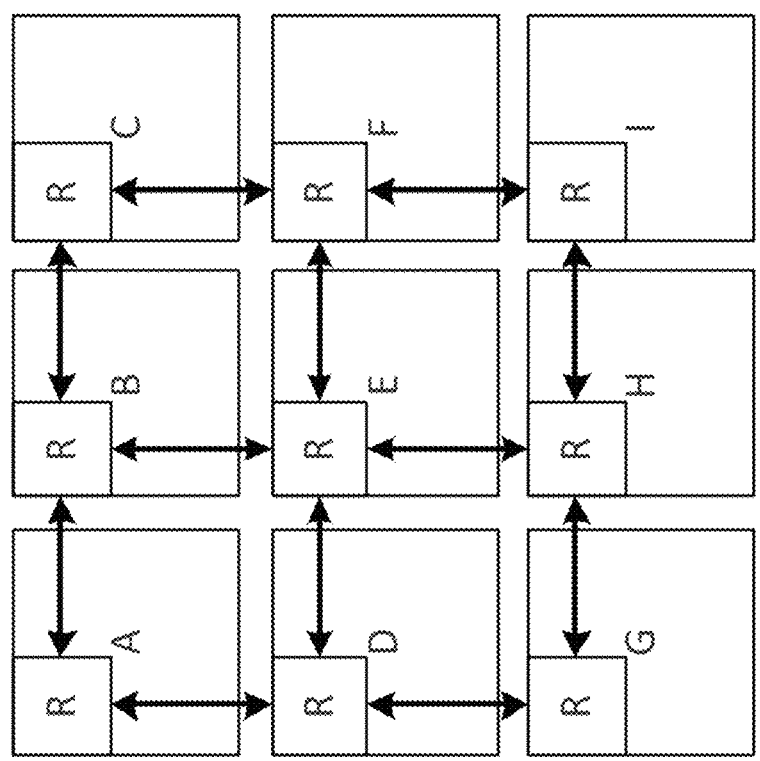
Figure 1C:
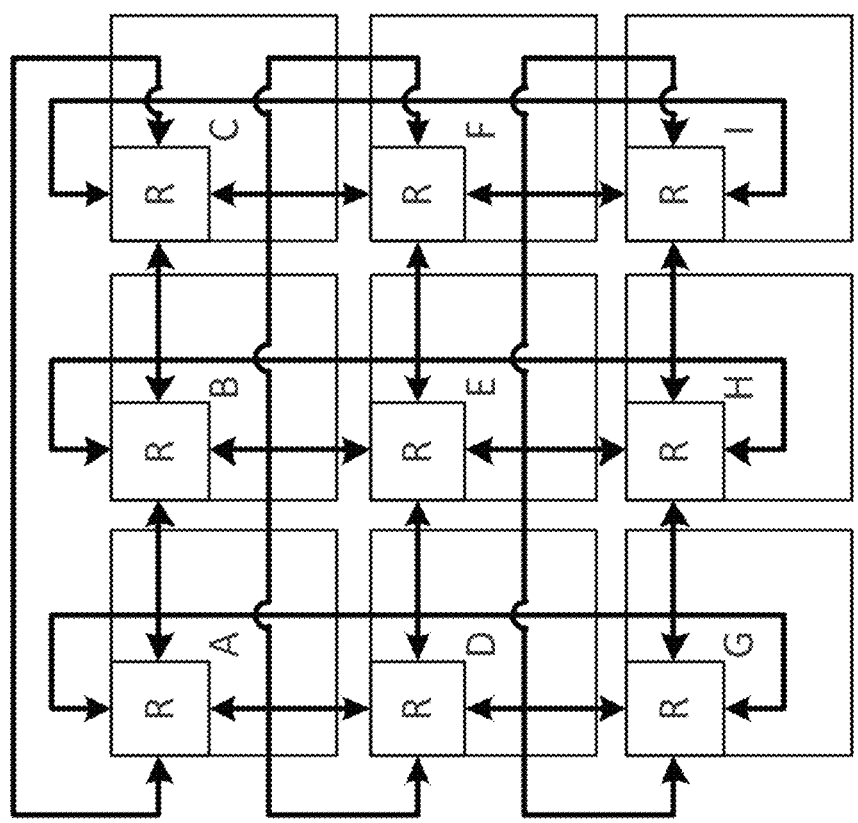
Figure 1D:
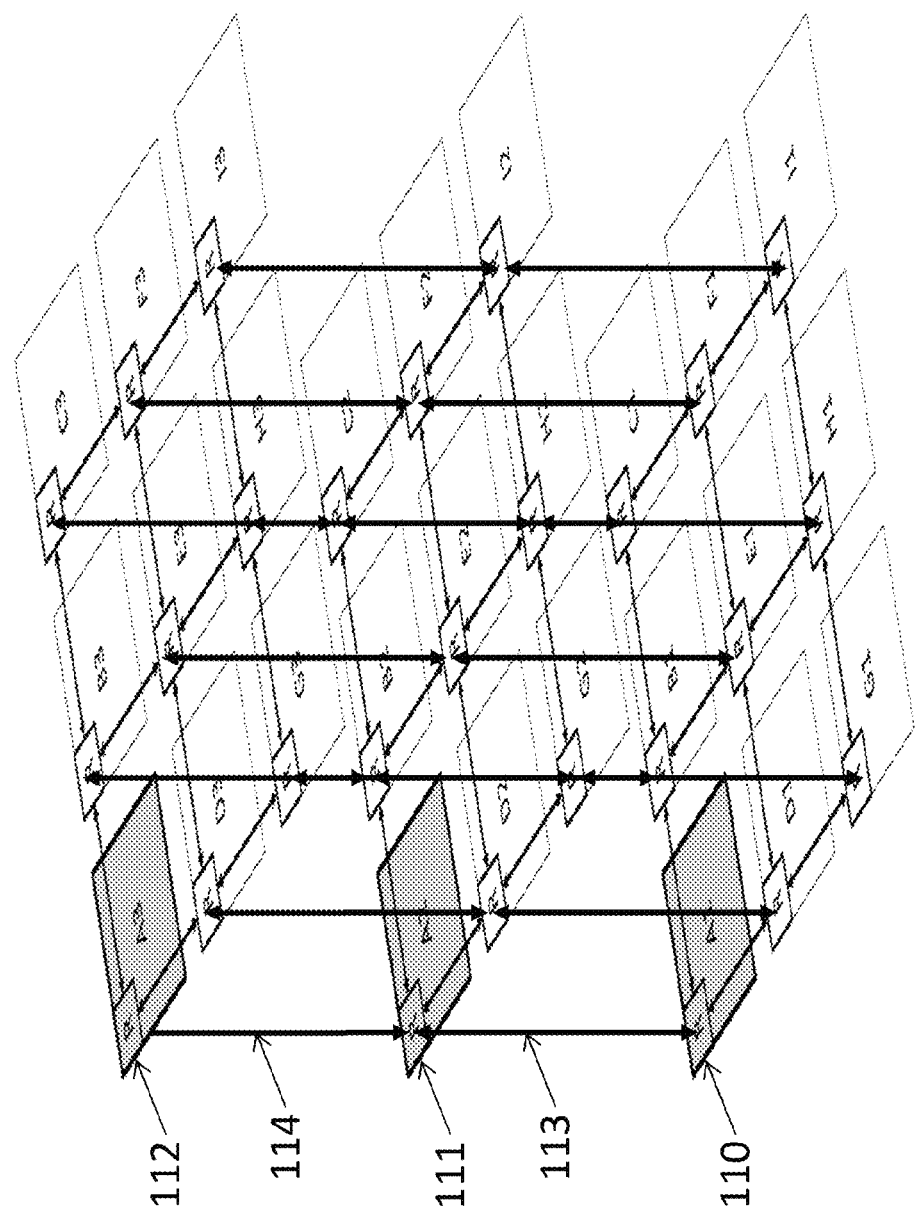
Figure 2A:
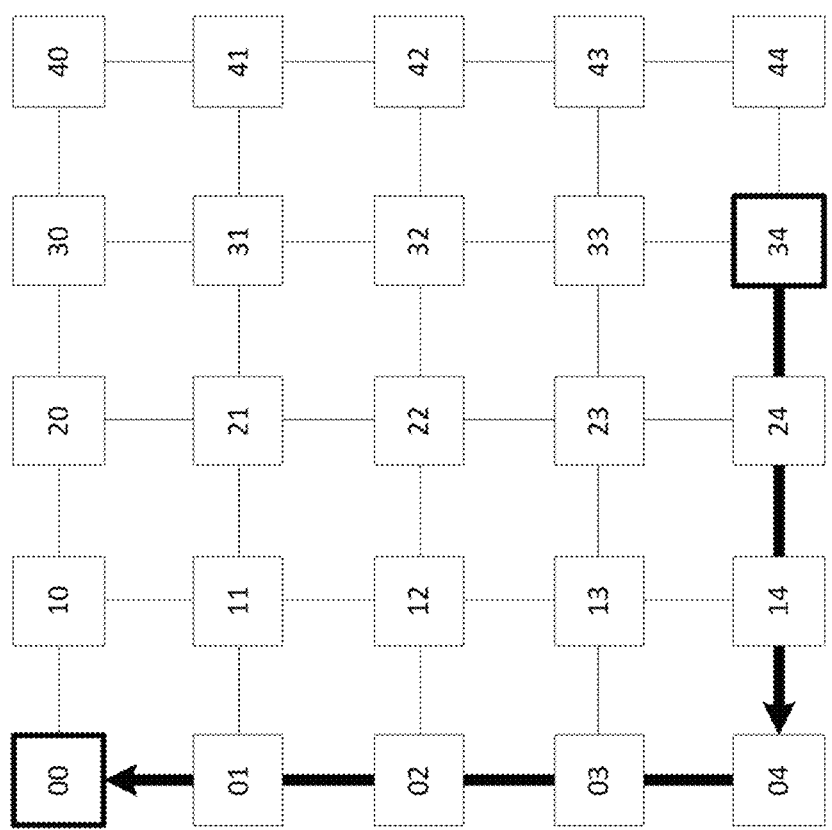
FIG. 2(a) illustrates an example of XY routing in a related art two dimensional mesh.
Figure 2B:
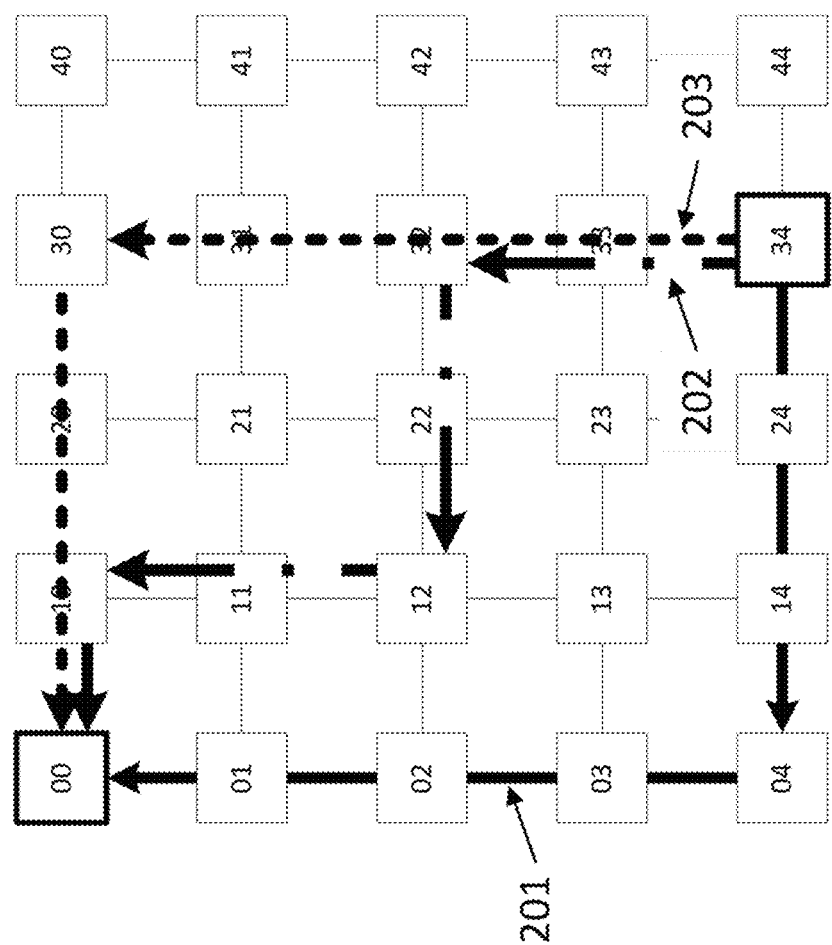
FIG. 2(b) illustrates three different routes between a source and destination nodes.
Figure 3A:
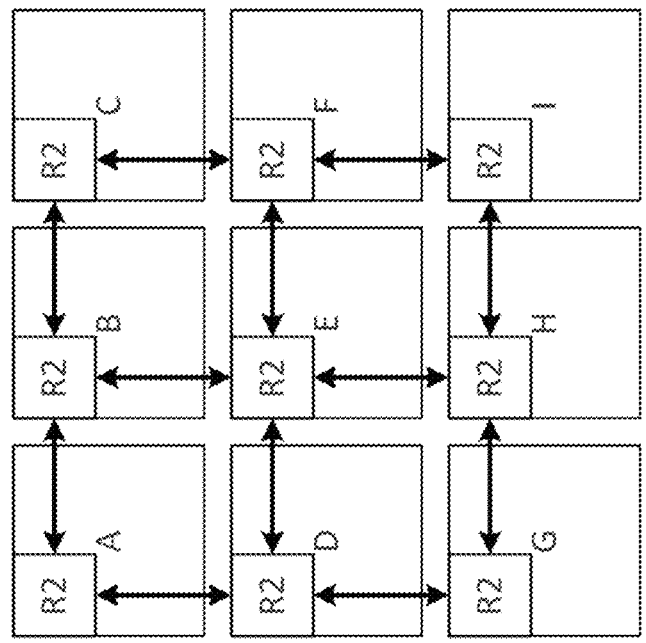
FIG. 3(a) illustrates an example of a related art two layer NoC interconnect.
Figure 3A:
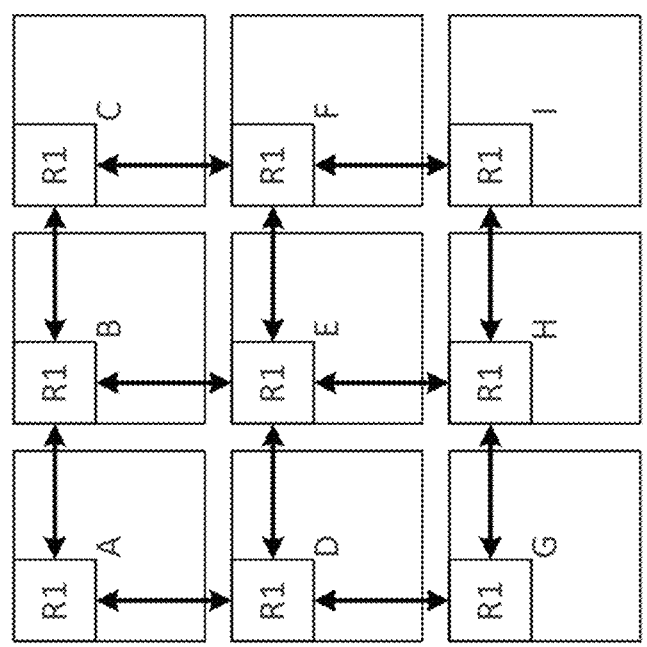
Figure 3B:
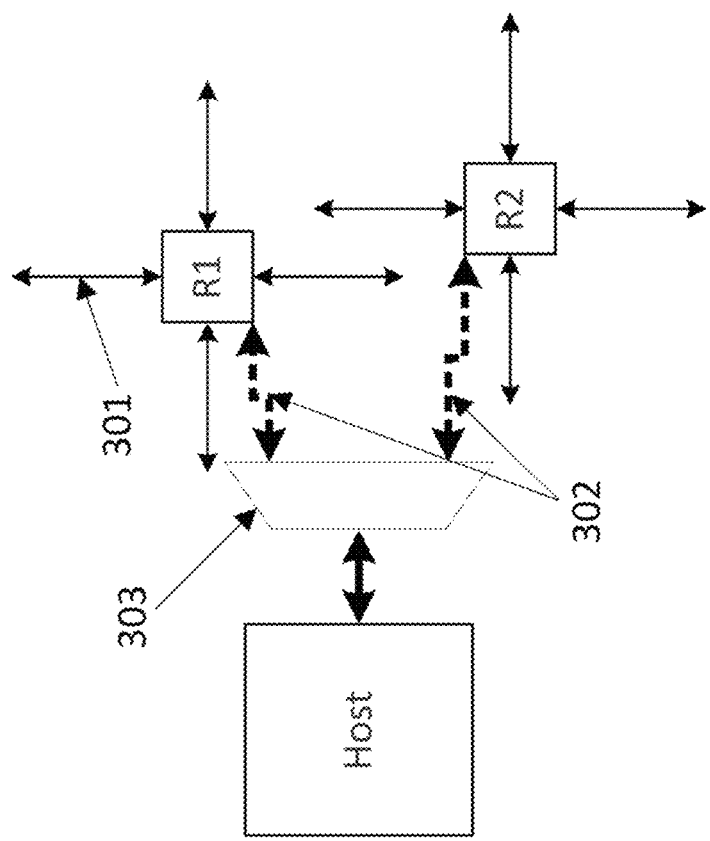
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Aspects of the present disclosure relates to methods, computer readable mediums, and NoC architectures/systems/constructions that can automatically mark and configure some channel of a NoC as store-and-forward channels, and other channels of the NoC as cut-through channels, and can further resize the buffers/channels based on the given NoC specification and associated traffic profile. An aspect of the present disclosure relates to a method for configuring a first set of plurality of channels of a NoC as store-and-forward channels, and configuring a second set of plurality of channels of the NoC as cut-through channels based on the determination of idle cycles in a given NoC specification and associated traffic profile.

In an aspect, methods of the present disclosure relates to configuring, for a Network on Chip (NoC), at least a first set of plurality of virtual channels of the NoC as a store and forward channels, and configuring a set of plurality of virtual channels of the NoC as cut-through channels. Methods of the present disclosure can further enable one or more hardware elements of the NoC to use the store-and-forward virtual channels for transmission of flits by storing the received flits into a buffer, until the buffer is full, end of packet flit is received or after a pre-configured timeout is reached, and then begin forwarding the flits of the packet through the store-and-forward virtual channels. Methods of the present disclosure can further facilitate one or more hardware elements of the NoC to use the cut-through channels for transmission of flits by forwarding received flits through at least one of the cut-through channels as and when received.

In another aspect, methods of the present disclosure includes the steps of receiving NoC specification and an associated traffic profile, determining the idle cycles for a plurality of virtual channels by analyzing the NoC specification and associated traffic profile, marking and configuring a first set of plurality of channels as store and forward channels, and marking and configuring a second set of plurality of channels as cut-through channels based on the determination of idle cycles. Methods of the present disclosure can further include the steps of resizing a plurality of input buffers and/or output buffers of the network elements, and resizing the plurality of downstream channels and/or upstream channels. In example implementations, resizing of the plurality of input buffers and/or output buffers can be performed by increasing and/or reducing the size and/or depth of buffers, whereas resizing of plurality of downstream channels and/or upstream channels can be performed by increasing and/or reducing width and/or depth of the channels.

In an example implementation, a network element of the NoC can have one or more of its input/upstream channels configured as store and forward channels, and other input/upstream channels configured as cut-through channels. In an example implementation, flits received at the input/upstream channels configured as store and forward channels can be stored in a buffer of the associated input port of the network element until all flits of a multi-flit packet are stored in the buffer or until the buffer is full. In an example implementation, all the flits received at a channel marked as store and forward channel can be stored into a buffer until the buffer the full, end of the packet flit is received, or after a pre-configured timeout is reached. In an example implementation, size of the buffer can be dynamically resized based on the traffic specification. In an example implementation, initial flits and subsequent flits of a multi-flit packet received from a channel marked and configured as store and forward channel participate in routing arbitration only if all flits of the multi-flit packet are stored in the buffer or if the buffer is full. In example implementation, flits received from a channel marked and configured as cut through channel participate in routing arbitration as soon as the initial flit containing the destination address is received.

In an example implementation, the first set of plurality of channels can be marked and configured as store and forward channels based on an occurrence of idle cycles between flits of a packet, and bandwidth requirement of the plurality of channels. In an example implementation, potential idle cycles between flits of a message can be determined by analyzing clock cycle difference of input channels and output channels, and/or by analyzing flit size difference of input channels and output channels, and/or by analyzing speed difference of input channels and output channels of network elements. In an example implementation, difference in channel width and/or depth of input channels and output channels can be used for determining the idle cycles.

In an example implementation, the first set of plurality of channels marked and configured as store and forward channels can be further marked and configured as cut-through channels in real time during different iterations based on the updated traffic profile and/or changing bandwidth requirement. Similarly, the second set of plurality of channels marked and configured as cut-through channels can be further changed/marked and configured as store and forward channels in real time during different iterations based on the updated traffic profile and/or changing bandwidth requirements.

In an example implementation, the size of the buffer for the channels marked as store and forward channel can be calculated using a function based on bandwidth and message size distribution of associated one or more channels configured as the store and forward channel.

In an aspect, the present disclosure relates to a Network on Chip (NoC) that has a plurality of virtual channels, wherein a first set of virtual channels of the NoC are configured as store and forward channels, and a second set of virtual channels of the NoC are configured as cut through channels such that one or more hardware elements of the NoC, for flits received for transmission to the first set of virtual channels, store the received flits into a buffer till the buffer is full or end of packet flit is received or after a pre-configured timeout is reached, and then forwards the flits of the packet through one of the first set of virtual channels. Similarly, one or more hardware elements of the NoC, for flits received for transmission to the second set of virtual channels, forward the received flits sooner they are received through one of the second set of virtual channels.

In another aspect, the first set of virtual channels include channels that are selected based on occurrence of idle cycles between flits of a message and/or based on bandwidth requirement of the virtual channels. Second set of channels are the remaining virtual channels.

In another aspect, virtual channels that are selected based on an occurrence of idle cycles between flits of a message can be selected based on any or a combination of virtual channels having differing clock ratios at an input and an output of the plurality of virtual channels, or virtual channels having differing flit sizes at the input and the output of the plurality of virtual channels, virtual channels having transmitters sending messages at lower speed than the speed of the plurality of virtual channels.

Figure 4A:
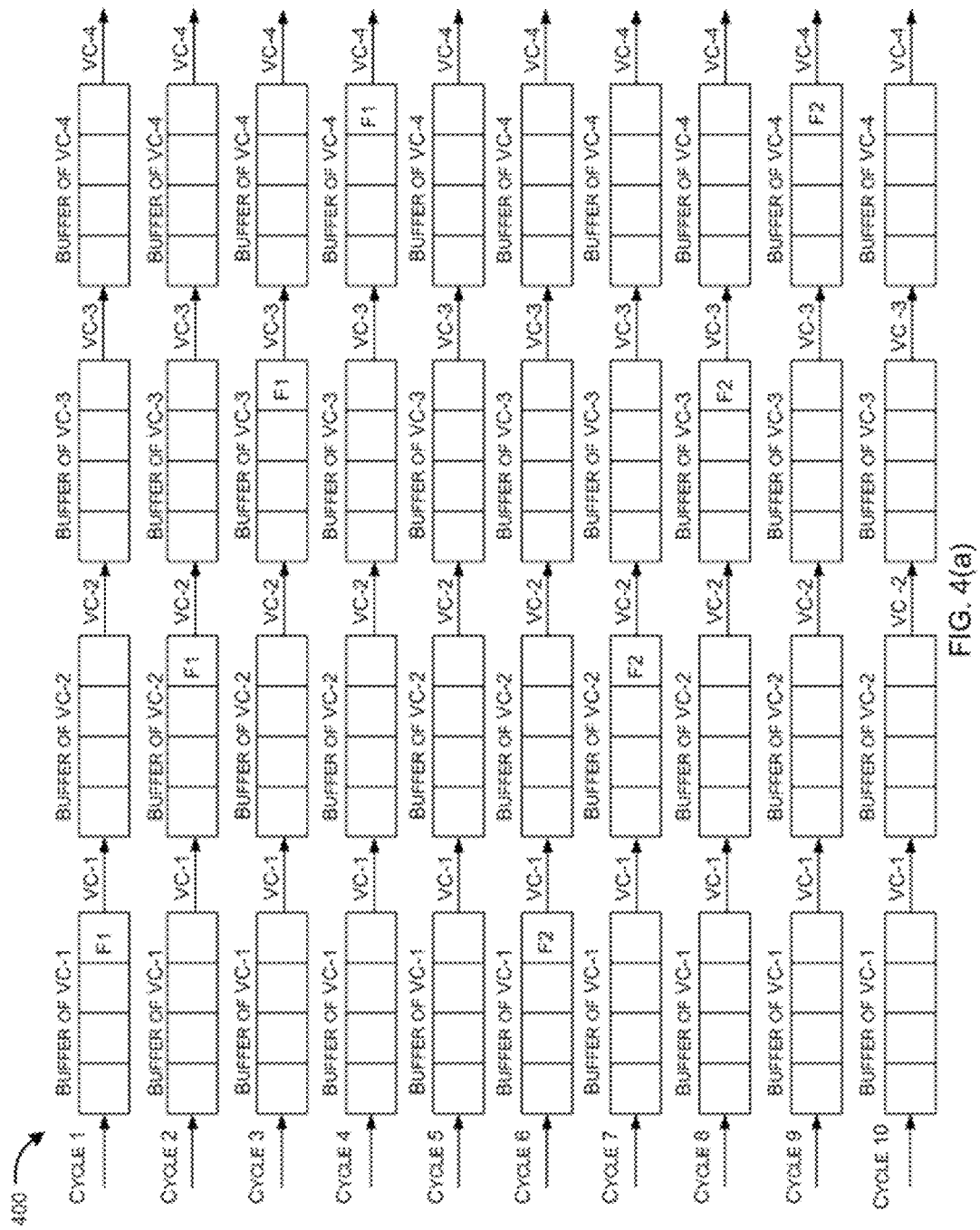
FIG. 4(a) illustrates an exemplary set of cut-through virtual channels that have idle cycles.

FIG. 4A illustrates an exemplary set of cut-through virtual channels that have idle cycles. As can be seen from the example representation of FIG. 4A, four virtual channels (VC_1, VC_2, VC_3, and VC_4,) can be configured as cut-through virtual channels, wherein in cycle 1, the first channel VC_1 receives a first flit F1 of a packet, which can be immediately sent onward to VC_2, and then to VC_3 and finally to VC_4, thereby locking/engaging all the four channels. Now, in cases where the second flit F2 of the packet is received by the VC_1 after multiple cycles such as shown in FIG. 4A, all the channels VC_1, VC_2, VC_3, and VC_4, having processed the first flit F1 remain engaged/locked, thereby creating idle cycles, during which the virtual channels are not processing any flit, which may lead to bottleneck situation in the network.

Figure 4B:
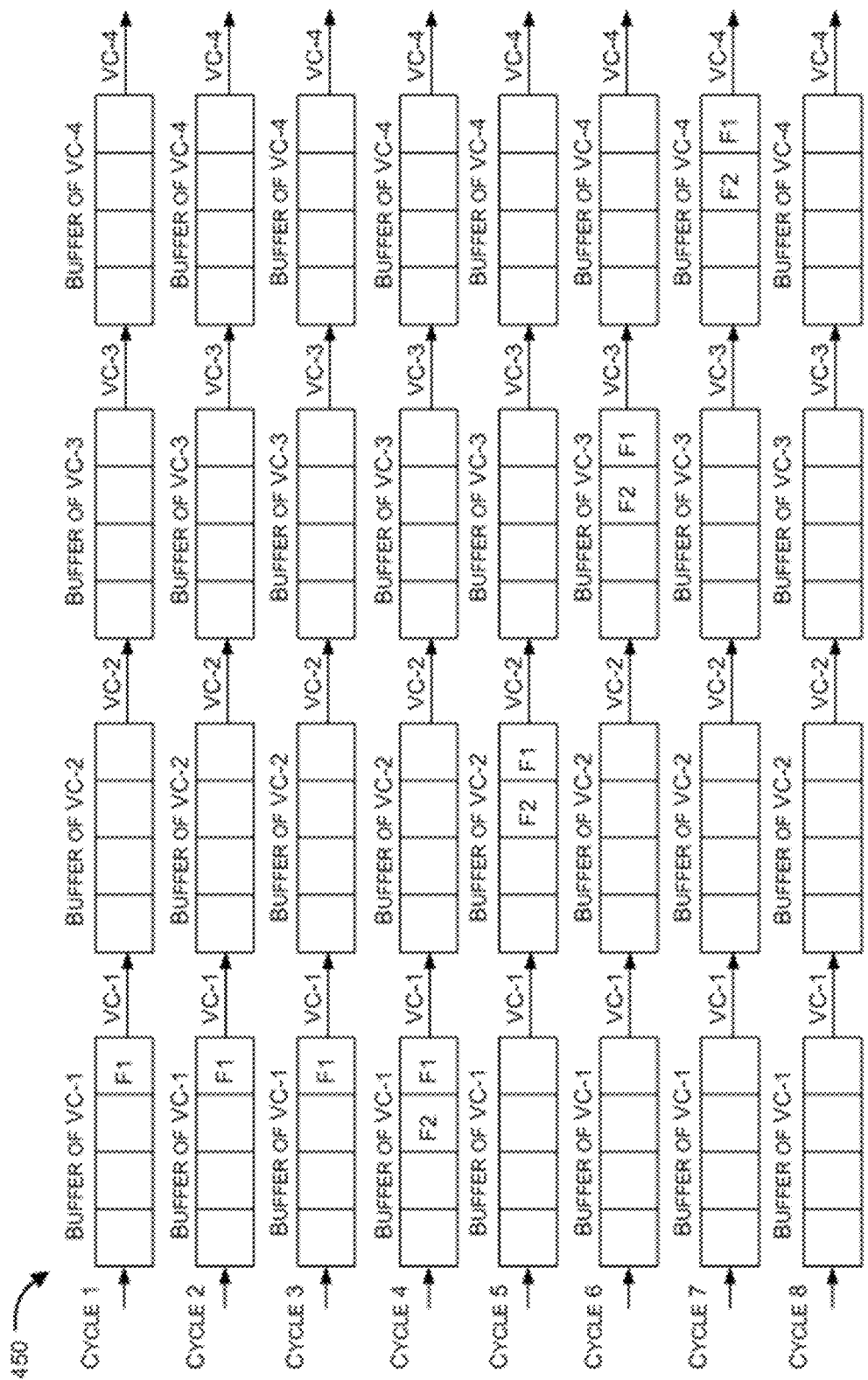
FIG. 4(b) illustrates a change in the type of NoC virtual channels from cut-through channels to store-and-forward channels to prevent idle cycle times in accordance with an example implementation of the present disclosure.

FIG. 4B illustrates a change in the type of NoC virtual channels from cut-through channels to store-and-forward channels to prevent idle cycle times in accordance with an example implementation of the present disclosure. With reference to FIG. 4A, in case the first channel VC_1 is configured as a store-and-forward channel, both the flits F1 and F2 can be buffered first before transmitting onto the subsequent channels VC_2, VC_3, and VC_4. This would help the VC_1 to be used only when all or desired number of the flits of a packet are buffered in its buffer so that VC_1 can send the flits such as F1 and F2 together to VC_2 for onward transmission to VC_3 and VC_4, thereby not creating congestion in the channels. Aspects of the present disclosure therefore aim at identifying channels with idle cycles, and determining the first channel causing the idle cycle(s) to take place, and marking it as a store-and-forward channel.

In an aspect of the present disclosure, in view of the above mentioned example implementation, in case one or more channels are configured as cut-through channels and face/encounter low flow rate traffic, the output VC's can get locked in sequence waiting for subsequent flits to arrive and also cannot serve/process flits of other packets. Similarly, the low rate can also be caused by the differential of clock ratios, wherein, for instance, the initial VC's (say the first output VC) working on slow clocks and subsequent VC's working on faster clocks can also cause the congestion with idle cycles being generated in the subsequent VC's. Other instances causing idle cycles/bubbles can also include instances where the transition from a first channel to a second channel is a low to high frequency transition, or narrow channel width to wide channel width transition. Similarly, in case there are bottlenecks in the upstream say due to small or no buffer, idle cycles/bubbles can be caused in the downstream. In an aspect, system of the present disclosure can be configured to detect the channel/buffer responsible for creating the idle cycle(s) and prevent the buffer from participating in the arbitration by putting a constraint on a defined number of flits to be present in the buffer before the output VC takes the buffered flits for transmission, making the channel a store-and-forward channel. By this way, the VC, in case of a low flow rate transmission, absorbs the idle cycles in the buffer itself, and does not lock itself and the subsequent VC's. Therefore, in an aspect, methods of the present disclosure can be configured to automatically identify all channels having idle cycles, evaluate transmission sequences and channel interconnections, and then mark the first channel causing the idle cycle as store-and-forward. The same method can then be iteratively applied to determine the next channel causing the next bottleneck point from upstream to downstream, and making such a channel as store-and-forward. In an aspect, every arbitration point that requires a clock change or has a narrow to wide width conversion can require a store-and-forward type channel.

In another aspect, the bandwidth requirement can also be evaluated to determine if a cut-through channel is to be changed to a store-and-forward channel, wherein in case bandwidth requirement at a first channel is lower than the bandwidth requirement at subsequent channels, the first channel can be marked as a store-and-forward channel. In another aspect, bandwidth requirement of input channel/output channel, traffic specification, and clock frequency can be taken into consideration while making a channel into a store-and-forward channel. For instance, if a first input channel works at 100 MHz and a second input channel works at 400 MHz, a large packet arriving at the first input channel can keep the second input channel in idle mode for a long time, and hence it becomes important to configure the first input channel as a store-and-forward channel and also configure its buffer size such that most of the packet flits, if not all, can be buffered therein.

In another aspect, systems of the present disclosure can also optimally size the buffers before initiating the arbitration process. For instance, in case the input channel works at 100 MHz and output channel works at 400 MHz (i.e. can transfer 4 flits per cycle), and in case the maximum packet size is expected to be 20 flits long, buffer size can be configured by the system, for example, to accommodate/store 16 flits such that by the time the 16 flits are transmitted from the output channel (in 4 cycles), the remaining 4 flits can be buffered in the buffer (at one flit per cycle). In an aspect, in case the speed of a first channel is x, and speed of a second channel is y, where x is less than y, buffer requirement can be defined by $((y-x)*(\text{maximum packet size}))/y$. Depending on the desired implementation, for a single flit packet, there may be no need of a store-and-forward channel, and the cut-through channel can thereby be maintained. In such an implementation, the traffic flow includes multi-flit packets to configure a channel as a store-and-forward channel.

In another aspect, methods of the present disclosure dynamically configure store-and-forward channels and cut-through channels of a NoC in accordance with an example implementation of the present disclosure. The method can receive a NoC specification and associated traffic profile of a NoC in real time, wherein the traffic profile of one or more network elements of the NoC can include, for instance, an indication of input and output channels capacities, observed traffic behaviors, average packet size, maximum packet size, and other traffic information of individual network elements and overall network.

Methods of the present disclosure can also determine potential idle cycles for a plurality of channels based on analysis of the NoC specification and the associated traffic profile, wherein the idle cycles can be determined based on an observed capability difference of input channels and output channels of one or more network elements. In an example implementation, potential idle cycles between flits of a message can be determined by analyzing clock cycle difference of input channels and output channels, and/or by analyzing flit size difference of input channels and output channels, and/or by analyzing speed difference of input channels and output channels of network elements. In an example implementation, the difference in channel width and/or depth of input channels and output channels can be used for determining the potential idle cycles. In another example implementation, an idle cycle, also referred interchangeably to as a bubble, can occur when a packet is received from a slower channel and needs to be forwarded to a faster channel. Similarly, an idle cycle can occur when a packet is received from a narrower channel and needs to be forwarded to a wider channel, or when the input channel size is lesser than the output channel size.

In an aspect, channels can be marked and configured as store-and-forward channels wherever an idle cycle or bubble is observed. In an example implementation, input channel of a network element operating at the slower clock frequency or receiving data at a slow speed at which the packet/flits are being received can be marked as store-and-forward channel. In an example implementation, the upstream channel/input channel at which a multi-flit packet is received and that is operating at a slower speed when compared with the downstream channel at which the received multi-flit packet needs be forwarded, can also be marked as store-and-forward channel.

In an example implementation, all flits of a multi flit packet received from a channel marked as store-and-forward channel can be stored in a buffer of the network element before participating in routing arbitration. In an example implementation, routing arbitration for flits received from store-and-forward channel can start only once the buffer is full or when the last flit of a packet has arrived in the buffer. In an example implementation, a single network element may have a plurality of channels (e.g. virtual channels) marked as store-and-forward channels, and hence a buffer is needed for every channel marked as store-and-forward channel. In another example implementation, a shared buffer can be used by a plurality of store-and-forward channels.

In another aspect, other channels that are not marked as store-and-forward channels can be marked and configured as cut-through channels. In an example implementation, flits received from cut-through channels participate in routing arbitration as soon as the initial flit containing the destination address is received.

Based on the analysis of the NoC specification and traffic profile, a plurality of input channels can resized. In an example implementation, size, depth and/or width of input/output channels can be increased based on the observed traffic profile. In an example implementation, one or more channels associated with a NoC element (e.g. a router), can be resized based on one or a combination of NoC specification, traffic profile, among other parameters/attributes.

Further, based on an analysis of the NoC specification and traffic profile, resizing can be conducted at buffers of input ports at which the flits from a channel marked as store-and-forward channel are received. In an example implementation, buffer size can be determined dynamically based on one or a combination of NoC specification, and traffic profile among other parameters/attributes. For instance, in an example where an input channel of a given network element has a capacity of 128 bits/cycle, and the output channel has a capacity of 256 bits/cycle, the size of the input channel can be automatically changed to have a capacity of 256 bits/cycle. In another example, if an input channel of a given router have a capacity of 64 bits/cycle, and the output channel has a capacity of 128 bits/cycle, the buffer size of the input channels can be increased to accommodate the complete packet (from start of packet (SOP) to end of packet (EOP)) before the same is transmitted in a single go to the 128 bits/cycle output channel.

In an example implementation, methods of the present disclosure can also mark and configure one or more network elements of a NoC to use store-and-forward architecture and mark and configure other network elements of the NoC to use cut-through architecture.

In an example implementation, a computer readable medium running the methods of the present disclosure can analyze a given NoC design and traffic going over the NoC channels and can automatically identify channels that may be marked as store-and-forward, and other channels that may be marked as cut-through channels or even as hybrid channels. Computer readable mediums can include instructions that when executed can examine the NoC channels and the upstream from where the channel receives traffic and downstream channels to which the channel transmits traffic, and compute a graph of data flow in the NoC.

In an example implementation, each node of the graph can indicate a NoC channel or an agent interface, and an edge between two nodes can indicate traffic flowing between one of the channels/interfaces and another of the channels/interfaces. The graph cannot be cyclic if the NoC does not have network level deadlock. In an example graph, the speed of the channels can be marked as a function of the clock frequency of the channel, width of the channel, and packet size distribution at the channel. In an example implementation, the speed of the channel may also depend on the amount of flow control input/output buffer available at the channel. In an example implementation, based on the speed of the graph, a directed breadth first traversal can be started from all root nodes of the graph, where the root nodes are the nodes at which there are no incoming edges.

In an example implementation, traversal using a directed breath first traversal approach can be conducted. During each traversal step, if the downstream channel is noted to be faster in terms of the above computed speed than the upstream channel, the upstream channel can be marked as a store-and-forward channel. When a channel is marked as store and forward, additional buffers may be allocated at the channel to hold either the entire packet or part of the packet that needs to be received in order to maintain full throughput. In another example implementation, traffic bandwidth requirements of the NoC channels along with the speed of the channel can be analyzed to determine idle cycles or bubbles to further mark the channels as store-and-forward type channels. For example, if speed of an upstream channel is 2× lower than its downstream channel(s) but the bandwidth requirements of the downstream channel is only 50% based on traffic specification, then it may not be required to mark the upstream channel as store and forward.

As a result, NoC will be using a combination of store-and-forward and cut-through switching at various channels of router nodes or network elements in a NoC. There may be several network elements/router nodes where some input channels may be configured as store-and-forward channels, while others may be configured as cut-through channels. Some channels may be partially store-and-forward, i.e. those channels do perform store and forward but do not necessarily have sufficient buffer to store largest packet sizes. In this case, the channel keeps storing a packet until the buffer is full, such that when the buffer is full, the input channel starts contending and act as cut-through for the remaining part of the packet.

Figure 5:
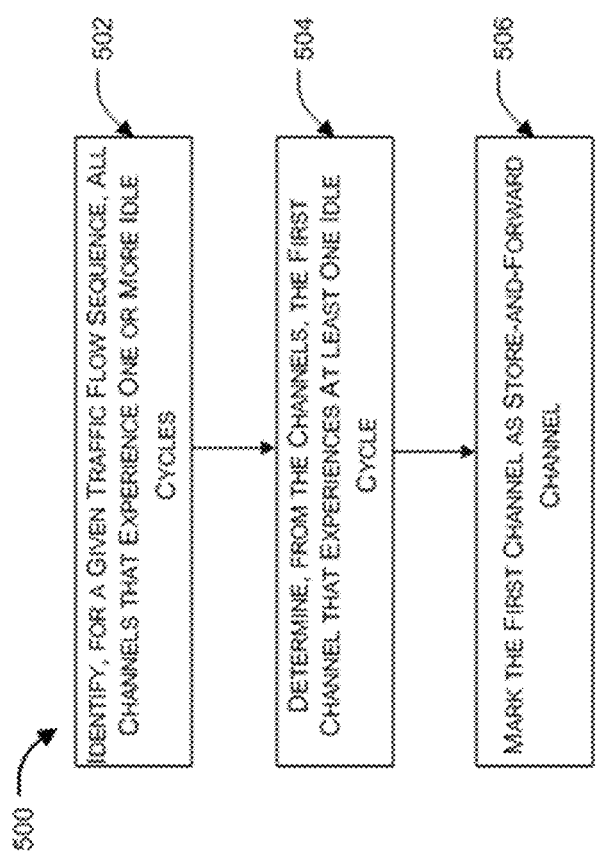
FIG. 5 illustrates an exemplary flow diagram for configuring one or more channels as store-and-forward channels in accordance with an example implementation of the present disclosure.

FIG. 5 illustrates an exemplary flow diagram for configuring one or more channels as store-and-forward channels in accordance with an example implementation of the present disclosure. At 502, all channels of a given sequence that are experiencing one or more idle cycles can be identified. In an example implementation, one or more idle cycles, also referred as bubbles, can be identified based on capacity mismatch of input channel and output channel. At 504, first channel of the given sequence that experiences the one or more idle cycles due to any or a combination of slow traffic flow rate, change in clock frequency, change in bandwidth requirement, change in channel width, among other like parameters, is determined, and at 506, the determined first channel is marked as a store-and-forward channel. The method can then be repeated for all other channels for the sequence and for other sequences that form part of the NoC. In an example implementation, all other channels that are not marked as store and forward channels can be configured as cut-through channels. In an example implementation, the buffer and the channel can be resized based on the traffic specification.

Figure 6:
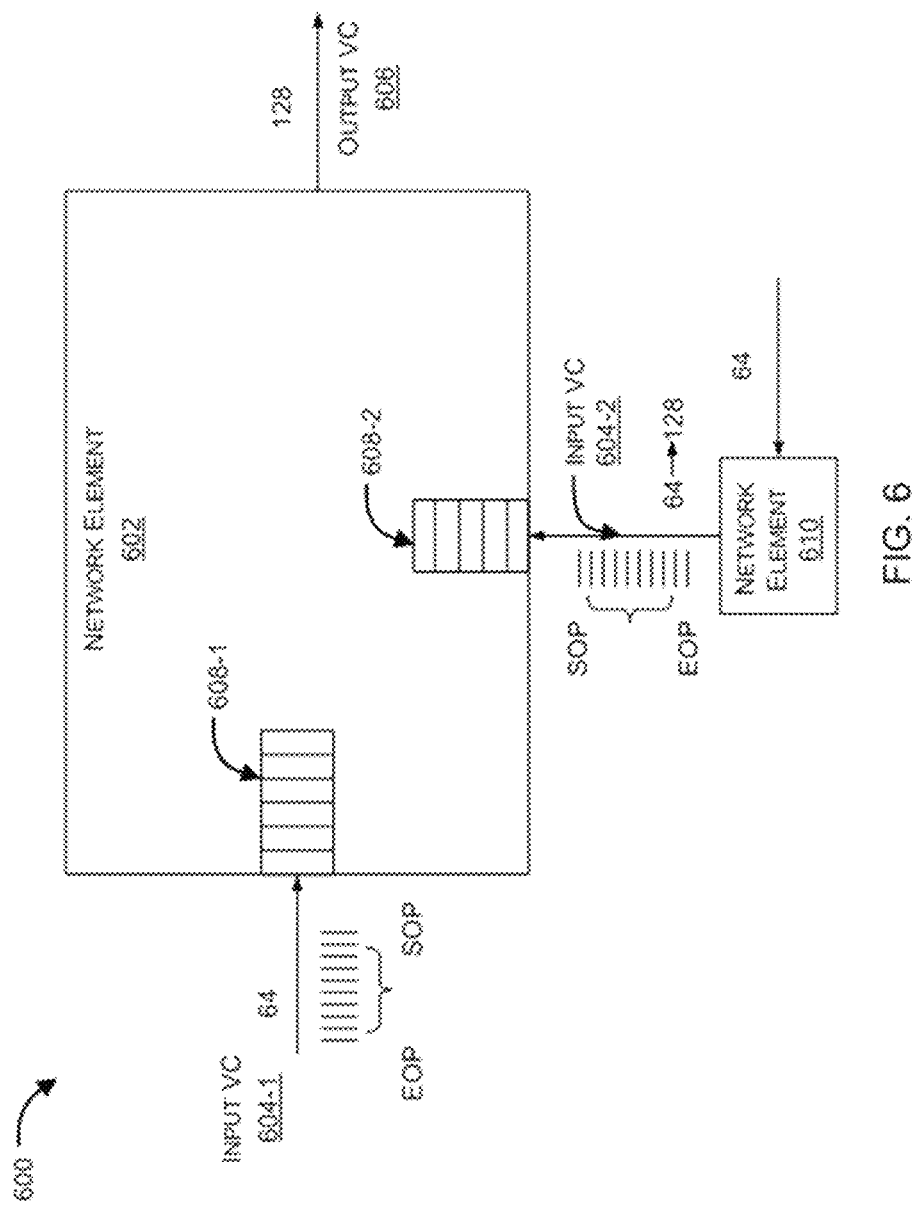
FIG. 6 illustrates an example resizing of channels and buffers in accordance with an example implementation of the present disclosure.

FIG. 6 illustrates an example resizing of channels and buffers in accordance with an example implementation of the present disclosure. FIG. 6 illustrates an example network element 602 that may have a plurality of input virtual channels, for example virtual channels VC 604-1 and VC 604-2, each of 64 bits width, collectively and interchangeably referred as input VCs 604, and an output virtual channel, for example output VC 606 of 128 bits width, that is wider than the two input VCs 604. In an example implementation, the traffic profile including details of all the input and output traffic flows at the network element 602 can be analyzed to determine the potential idle cycles and/or bubbles at the output virtual channel 606. Furthermore, based on the determined potential idle cycle, one of the input VC, for example input VC 604-1, can be marked as a store and forward channel, and the other input VC, for example input VC 604-2, can be marked as a cut through channel. In an example implementation, based on the determined potential idle cycles and/or bubbles at the output virtual channel 606, the input VCs 604 can be resized. In an example implementation, one or more of the plurality of channels marked as cut-through channels can be resized to achieve better utilization and throughput of the network resources. In another example implementation, upon receiving an initial flit of multi-flit packets at the cut through channel, the network element 602 can start routing arbitration to schedule the initial flit and subsequent flits of the packet to be forwarded by output VC 606, and lock the output VC 606 for the entire duration until the last flit of the packet is forwarded over the output VC 606. Due to implementation of such a locking mechanism, even though the size of the output VC 606 (128 bits) is equal to that of the combination of the size of input VC 604-1 and of input VC 604-2, it may not provide desired efficiency, and bandwidth available at output VC 606 may not be fully utilized, thereby reducing the overall throughput of the network element.

In order to improve the throughput, latency and utilization of network resources, one of input VC, for example input VC 604-1, can be marked as store and forward channel, and another VC, for example input VC 604-2, can be marked as cut-through channel. Further, the input VC 604-2 that is marked as cut-through channel can be upsized from 64 bits to 128 bits to enable reading/sending of packets at 128 bits/cycle. In an example implementation, input VC 604-1 and input VC 604-2 may respectively have associated input buffers such as buffer 608-1 and buffer 608-2. In an example implantation, size of the buffer 608-1 and the buffer 608-2 can depend of marking of virtual channels 604-1 and 604-2 as store-and-forward channel and/or cut-through channel. In an example implementation, size of the buffer 608-1 for the input VC 604-1 that is marked as store-and-forward channel can be equal to the average size or largest possible size of packets travelling through the input VC 604-1. In an example implementation, size of the buffer 608-2 for the input VC 604-2 that is marked as cut through channel can be as small so as to just store the initial flit of the packet.

In an example implementation of the present disclosure, in order to optimize the size of VCs 604, when a packet is received at input channel say VC 604-1, the NoC component/element 602 can schedule the output VC 606 to buffer the entire packet (which may include several flits) from start of packet (SOP) to end of packet (EOP) in the buffer 608-1 without multiplexing it with packets of other input VC say VC 604-2, and then send the packet from the buffer 608-1 to the output VC 606 when the complete packet is buffered or when the buffer is full or when a predefined time has lapsed. In an example implementation, flits of the packet stored in the buffer 608-1 can participate in routing arbitration once the buffer 608-1 is full or all the flits of the packets are stored in the buffer 608-1 or a predefined time interval has lapsed. All the flits of packet received at the channel, marked and configured as store-and-forward channel can be stored/buffered before being forwarded to the output channel. In case however, if the buffer is full, the already buffered part of the packet can be sent, during which time, remaining part of the packet can be buffered for subsequent issuances. According to one example implementation, buffer, for example buffer 608-1, of the channel marked as store-and-forward channel, for example input VC 604-1, can be dynamically sized based on the observed traffic profile.

One can appreciate that, based on the determined idle cycle or bubble in the network, one or more output channels can be marked as store-and-forward channels and other output channels can be marked as cut-through channels. Similarly, output ports of the output channels marked as store and forward channels can have dynamically configurable buffers, size of which can be changed based on the observed traffic profile.

In an example implementation, size of the buffer can be equal to average size of the packet passing through the input port or the maximum size of packet for which the network may have been designed. In an example implementation, the routing arbitration process can be started even when the majority of the flits are stored in the buffer. For example, in case of a multi flit packet of 20 flits, once the buffer has 16 flits stored in it, routing arbitration can be started, because by the time the 16 flits are sent through, the input channel will receive the remaining 4 flits in the buffer and those can be sent subsequently.

In an example implementation, read speed of the store-and-forward buffers 608-1 can be equal to the read and forward speed of output channel 608 for which the store and forward buffer was added. In an example implementation, store-and-forward buffer in the above example can be configured to be read at 128-bit per cycle or at clock speed equal to the output channel. In some cases the read speed may be lower if the bandwidth requirement of the output channel is not high. In an example implementation, the buffer size can be calculated using the formula, buffer size=$((Y-X)/X)*$(Max-Packet Size), wherein the Y is the size of output channel, X is the size of input channel, and (Max-Packet Size) is the size of largest possible packet for which the network may have been designed.

Figure 7:
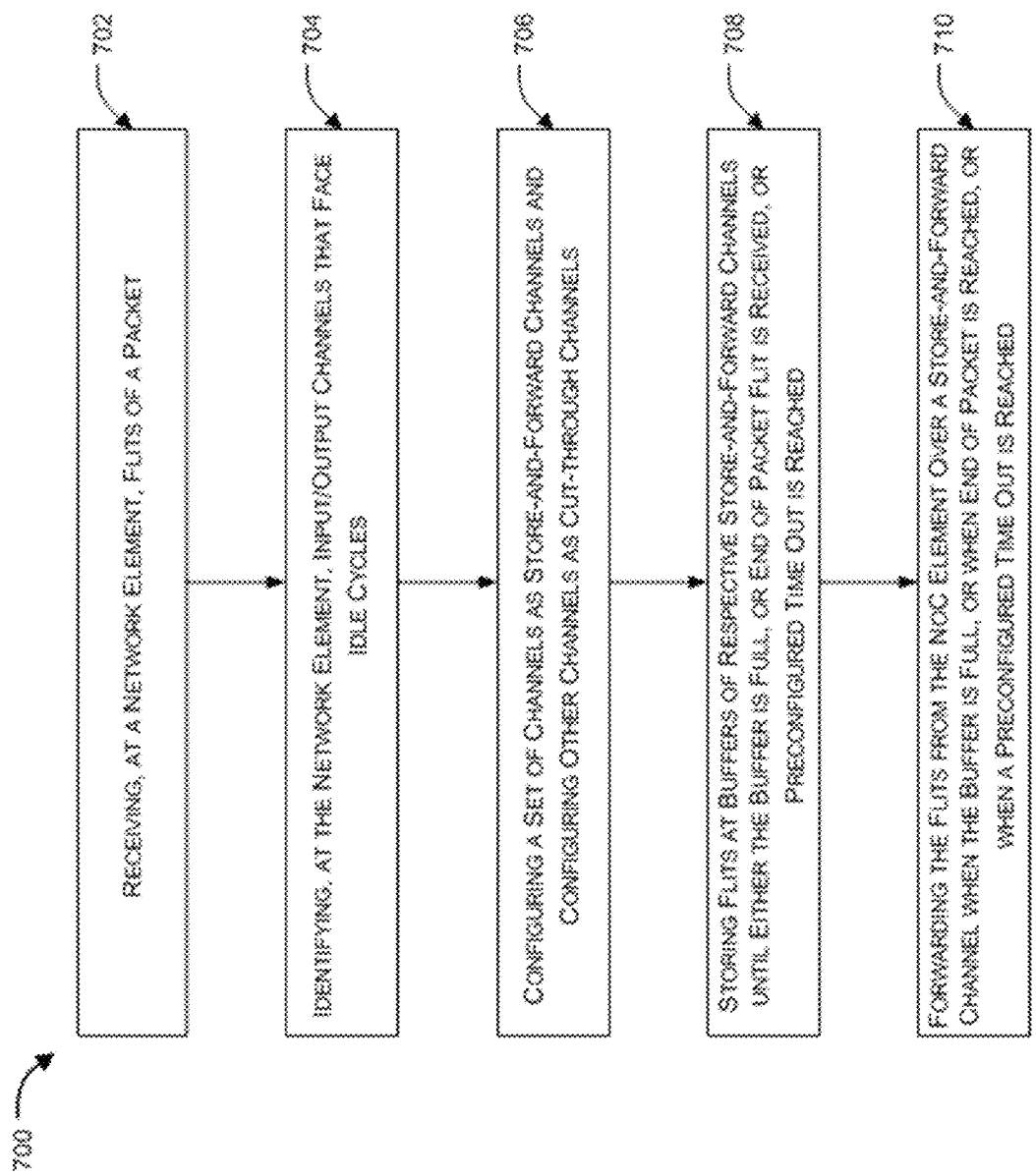
FIG. 7 illustrates an example flow diagram for the operation of the NoC hardware element in accordance with an example implementation of the present disclosure.

FIG. 7 illustrates an example flow diagram 700 for the operation of the NoC hardware element in accordance with an example implementation of the present disclosure. As shown at 702, in an example implementation, a hardware/network element can be configured to receive flits of a packet. As shown at 704, the NoC elements can be configured to identify channels that face idle cycles. In an example implementation, capacity of input channels and/or output channels connected with the NoC element can be analyzed along with the traffic behavior to determine the idle cycle.

At 706, a set of channels can be configured as store-and-forward channels, and other channels can be configured as cut-through channels. In an example implementation, both input channels as well as output channels can be marked or configured as store-and-forward channels or cut-through channels. In an example implementation, NoC elements may have a buffer associated with each channel that is configured as store-and-forward channel for storing the flits of packets received for that channel. At 708, the NoC element can be configured to store flits of a packet at the buffer of store-and-forward channel(s) until either the buffer is full, or end of packet flit is received, or a predefined time is reached. At 710, the NoC element can be configured to forward the flits of packets from the NoC element over a store-and-forward channel when the buffer is full, or when end of packet flit is received, or when a predefined time is reached. In an example implementation, based on changing traffic behavior or traffic specification, set of channels configured as store and forward channels can be configured as cut-through channels. Similarly, in an example implementation, based on changing traffic behavior or traffic specification, set of channels configured as cut-through channels can be configured as store and forward channels.

Figure 8:
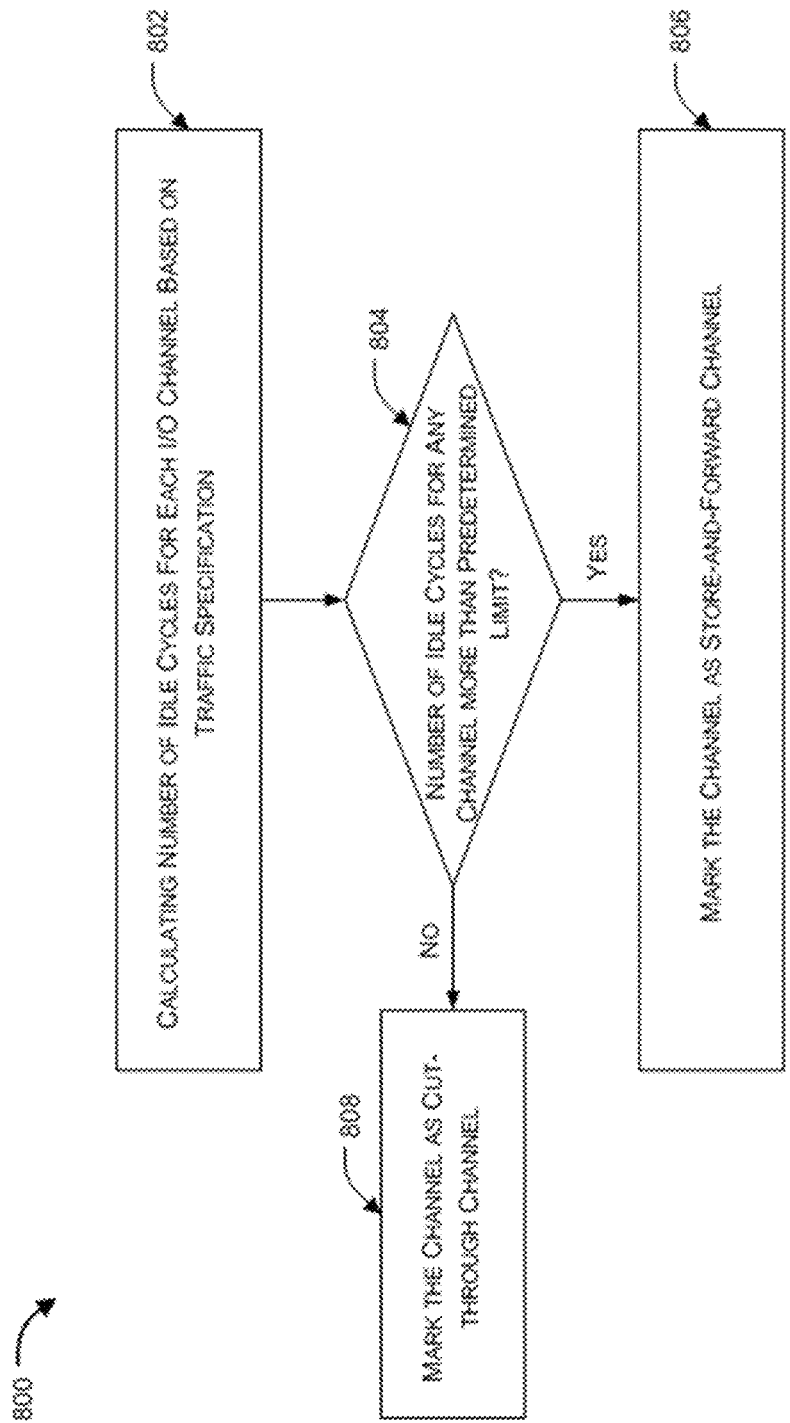
FIG. 8 illustrates an example flow diagram for identify store and forward channels and configuring cut-through channel as store and forward channel in accordance with an example implementation of the present disclosure.

FIG. 8 illustrates an example flow diagram 800 for identifying store and forward channels and configuring cut-through channel(s) as store-and-forward channel(s) in accordance with an example implementation of the present disclosure. As shown in flow diagram 800, at 802, a NoC can be configured to continuously calculate the number of idle cycles with respect to one or more input/output (I/O) channels based on traffic specification and/or observed traffic behavior. As shown at 804, the NoC can check if the number of idle cycles for any channel is more than a predefined limit. In an example implementation, if the number of idle cycles are more than the limit, the channel can be configured as store-and-forward channel, as shown at 806, else, as shown at 808, the channel can be configured as cut-through channel. It would be apparent to a person ordinarily skilled in the art that the channel marked and configured as store-and-forward channel can further be marked and configured as cut-through channel if the idle cycle over the corresponding channel is not observed.

FIG. 9 illustrates an example computer system on which example implementation can be present disclosure can be executed in accordance with an example implementation of the present disclosure. The computer system 900 includes a server 905 which may involve an I/O unit 935, storage 960, and a processor 910 operable to execute one or more units as known to one of skill in the art. The term "computer-readable medium" as used herein refers to any medium that participates in providing instructions to processor 910 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include carrier waves. The I/O unit processes input from user interfaces 940 and operator interfaces 945 which may utilize input devices such as a keyboard, mouse, touch device, or verbal command.

The server 905 may also be connected to an external storage 950, which can contain removable storage such as a portable hard drive, optical media (CD or DVD), disk media or any other medium from which a computer can read executable code. The server may also be connected an output device 955, such as a display to output data and other information to a user, as well as request additional information from a user. The connections from the server 905 to the user interface 940, the operator interface 945, the external storage 950, and the output device 955 may via wireless protocols, such as the 802.11 standards, Bluetooth® or cellular protocols, or via physical transmission media, such as cables or fiber optics. The output device 955 may therefore further act as an input device for interacting with a user.

The processor 910 may execute one or more modules including input specification receiving module 911, an idle cycle determination module 912, a store and forward channel configuration module 913, a cut through channel configuration module 914, and optional modules, such as buffer resizing module 915, and channel resizing module 916.

In an example implementation, the input specification receiving module 911 can be configured to receive NoC specification and associated traffic profile. Input specification receiving module 911 can be configured to receive traffic profile of one or more network elements of the NoC and can include details such as an indication of input and output channel capacities, observed traffic behavior, average packet size, maximum packet size, and other traffic information of all individual network elements and overall network.

In an example implementation, the idle cycle determination module 912 can be configured to determine the potential idle cycles for plurality of channels based on analysis of the NoC specification and associated traffic profile. In an example implementation, idle cycles for a plurality of output channels of the network can be determined based on observed capability difference of input channels and output channels of network elements. In an example implementation, potential idle cycles between flits of a message can be determined by analyzing clock cycle differences of input channels and output channels, and/or by analyzing flit size differences of input channels and output channels, and/or by analyzing speed differences of input channels and output channels of network elements. In an example implementation, difference in channel width and/or depth of input channels and output channels can be used for determining the potential idle cycles. In another example implementation, an idle cycle, also referred interchangeably as a buffer, can occur when a packet is received from a slower channel and needs to be forwarded to a faster channel. Similarly, an idle cycle can occur when packet is received from a narrower channel and needs to be forwarded to a wider channel, or when the input channel size is less than output channel size.

In an example implementation, the store and forward channel configuration module 913 can be configured to assign/mark at least one channel as a store-and-forward channel based on the number of observed idle cycles and/or bubbles. In an example implementation, an input channel of a network element that is operating at a slower clock frequency or receiving data at a slow speed at which the packets/flits are being received can be marked as store-and-forward channel. In an example implementation, downstream channels/input channels at which the multi flit packet is received, operating at the slower speed when compared to the upstream channel/output channel at which the received multi flit packet needs be forwarded can be marked as store and forward channel. In another example implementation, downstream channels/input channels at which the multi flit packet is received, having smaller width/depth as compared to the output channel at which the received multi flit packet received needs to be forwarded can be marked as store and forward channel.

In an example implementation, all flits of a multi flit packet received from a channel that is marked as a store and forward channel can be stored in a buffer of the network element before participating in routing arbitration. In an example implementation, the routing arbitration for flits received from store and forward channels can start once the buffer is full or when the last flit of packet has arrived at the network element. In an example implementation, a network element may have a plurality of its channel (virtual channels) marked as store and forward channels, and hence a buffer can be needed for each store and forward channel. In another example implementation, a shared buffer can be used by plurality of store and forward channels.

In an example implementation, the cut through channel configuration module 914 can be configured to mark/assign at least one channel, which are not marked as store and forward channel, as cut-through channel. In an example implementation, flits received from cut-through channels can participate in routing arbitration as soon as an initial flit containing the destination address is received.

In an example implementation, the buffer resizing module 915 can be configured to resize the corresponding buffer of store and forward channel based on analysis of the NoC specification and traffic profile. In another example implementation, the channel resizing module 916 can be configured to resize the downstream/input channels, wherein the channel size (size, depth and/or width of channel) can be increased based on observed traffic profile. In an example implementation, one or more channels associated with a NoC element such as a router, can be resized based on one or a combination of NoC specification, traffic profile among other parameters/attributes. In an example implementation, plurality of channels marked as store and forward channels can be resized.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present disclosure will be apparent to those skilled in the art from consideration of the specification and practice of the teachings of the present disclosure. Various aspects and/or components of the described example implementations may be used singly or in any combination. It is intended that the specification and example implementations be considered as examples only, with the true scope and spirit of the present disclosure being indicated by the following claims.

What is claimed is:

1. A method for a Network on Chip (NoC) comprising:
configuring at least a first one of a plurality of virtual channels of the NoC as a store and forward channel; and
configuring at least a second one of the plurality of virtual channels of the NoC as a cut through channel;
wherein one or more hardware elements of the NoC are configured to:
for flits received for transmission to the at least the first one of the plurality of virtual channels, store received flits into a buffer until the buffer is full, end of the packet flit is received, or after a pre-configured timeout is reached, and then begin forwarding the flits of a packet through the first virtual channel; and
for flits received for transmission to the at least the second one of the plurality of virtual channels, forward the flits through the second virtual channel as received.

2. The method of claim 1, wherein the configuring the at least the first one of the plurality of channels of the NoC as the store and forward channel is conducted for ones of the plurality of virtual channels based on an occurrence of idle cycles between flits of a message for the ones of the plurality of virtual channels and a bandwidth requirement of the ones of the plurality of virtual channels; and
wherein the configuring the at least the second one of the plurality of virtual channels of the NoC as the cut through channel is conducted for remaining ones of the plurality of virtual channels.

3. The method of claim 2, further comprising determining the occurrence of idle cycles between flits of a message for the ones of the plurality of virtual channels by identifying at least one of:
   ones of the plurality of virtual channels having differing clock ratios at an input and an output of the ones of the plurality of virtual channels;
   ones of the plurality of virtual channels having differing flit sizes at the input and the output of the ones of the plurality of virtual channels; and
   ones of the plurality of virtual channels having transmitters sending messages at lower speed than a speed of the ones of the plurality of virtual channels.

4. The method of claim 1, further comprising calculating a size for the buffer for each of the one or more hardware elements from a function based on bandwidth and message size distribution of associated one or more channels configured as the store and forward channel.

5. The method of claim 1, further comprising:
   during operation of the NoC, reconfiguring one or more of the at least the first one of the plurality of virtual channels of the NoC configured as the store and forward channel to the cut through channel based on a traffic and load on the at least the first one of the plurality of virtual channels of the NoC.

6. The method of claim 1, further comprising:
   during operation of the NoC, reconfiguring one or more of the at least the second one of the plurality of virtual channels of the NoC configured as the cut through channel to the store and forward channel based on a traffic and load on the at least the second one of the plurality of virtual channels of the NoC.

7. A non-transitory computer readable medium store instructions for executing a process for a Network on Chip (NoC), the instructions comprising:
   configuring at least a first one of a plurality of virtual channels of the NoC as a store and forward channel; and
   configuring at least a second one of the plurality of virtual channels of the NoC as a cut through channel;
   wherein one or more hardware elements of the NoC are configured to:
      for flits received for transmission to the at least the first one of the plurality of virtual channels, store received flits into a buffer, until the buffer is full, end of packet flit is received, or after a pre-configured timeout is reached, and then begin forwarding the flits of a packet through the first virtual channel; and
      for flits received for transmission to the at least the second one of the plurality of virtual channels, forward the flits through the second virtual channel as received.

8. The non-transitory computer readable medium of claim 7, wherein the configuring the at least the first one of the plurality of channels of the NoC as the store and forward channel is conducted for ones of the plurality of virtual channels based on an occurrence of idle cycles between flits of a message for the ones of the plurality of virtual channels and a bandwidth requirement of the ones of the plurality of virtual channels; and
   wherein the configuring the at least the second one of the plurality of virtual channels of the NoC as the cut through channel is conducted for remaining ones of the plurality of virtual channels.

9. The non-transitory computer readable medium of claim 8, wherein the instructions further comprise determining the occurrence of idle cycles between flits of a message for the ones of the plurality of virtual channels by identifying at least one of:
   ones of the plurality of virtual channels having differing clock ratios at an input and an output of the ones of the plurality of virtual channels;
   ones of the plurality of virtual channels having differing flit sizes at the input and the output of the ones of the plurality of virtual channels; and
   ones of the plurality of virtual channels having transmitters sending messages at lower speed than a speed of the ones of the plurality of virtual channels.

10. The non-transitory computer readable medium of claim 7, wherein the instructions further comprise calculating a size for the buffer for each of the one or more hardware elements from a function based on bandwidth and message size distribution of associated one or more channels configured as the store and forward channel.

11. The non-transitory computer readable medium of claim 7, wherein the instructions further comprise:
   during operation of the NoC, reconfiguring one or more of the at least the first one of the plurality of virtual channels of the NoC configured as the store and forward channel to the cut through channel based on a traffic and load on the at least the first one of the plurality of virtual channels of the NoC.

12. The non-transitory computer readable medium of claim 7, wherein the instructions further comprise:
   during operation of the NoC, reconfiguring one or more of the at least the second one of the plurality of virtual channels of the NoC configured as the cut through channel to the store and forward channel based on a traffic and load on the at least the second one of the plurality of virtual channels of the NoC.

13. A Network on Chip (NoC) comprising:
   a plurality of virtual channels, wherein at least a first one of a plurality of virtual channels of the NoC is configured as a store and forward channel, wherein at least a second one of the plurality of virtual channels of the NoC is configured as a cut through channel;
   one or more hardware elements of the NoC, each of the one or more hardware elements configured to:
      for flits received for transmission to the at least the first one of the plurality of virtual channels, store received flits into a buffer, until the buffer is full, end of packet flit is received, or after a pre-configured timeout is reached, and then begin forwarding the flits of a packet through the first virtual channel; and
      for flits received for transmission to the at least the second one of the plurality of virtual channels, forward the flits through the second virtual channel as received.

14. The NoC of claim 13, wherein the at least the first one of the plurality of channels of the NoC comprise ones of the plurality of virtual channels selected based on an occurrence of idle cycles between flits of a message for the ones of the plurality of virtual channels and a bandwidth requirement of the ones of the plurality of virtual channels; and
   wherein the at least the second one of the plurality of virtual channels of the NoC are remaining ones of the plurality of virtual channels.

15. The NoC of claim 14, wherein the ones of the plurality of virtual channels selected based on an occurrence of idle cycles between flits of a message is selected from at least one of:

ones of the plurality of virtual channels having differing clock ratios at an input and an output of the ones of the plurality of virtual channels;

ones of the plurality of virtual channels having differing flit sizes at the input and the output of the ones of the plurality of virtual channels; and ones of the plurality of virtual channels having transmitters sending messages at lower speed than a speed of the ones of the plurality of virtual channels.

16. The NoC of claim 13, wherein the buffer is sized for each of the one or more hardware elements from a function based on bandwidth and message size distribution of associated one or more channels configured as the store and forward channel.

17. The NoC of claim 13, wherein each of the one or more hardware elements are configured to:

during operation of the NoC, reconfigure one or more of the at least the first one of the plurality of virtual channels of the NoC configured as the store and forward channel to the cut through channel based on a traffic and load on the at least the first one of the plurality of virtual channels of the NoC.

18. The NoC of claim 13, wherein each of the one or more hardware elements are configured to:

during operation of the NoC, reconfigure one or more of the at least the second one of the plurality of virtual channels of the NoC configured as the cut through channel to the store and forward channel based on a traffic and load on the at least the second one of the plurality of virtual channels of the NoC.

* * * * *